(12) United States Patent
Tsuji

(10) Patent No.: US 9,806,798 B2
(45) Date of Patent: Oct. 31, 2017

(54) WIRELESS COMMUNICATION APPARATUS, BASE STATION SYSTEM, AND WIRELESS COMMUNICATION APPARATUS CONTROLLING METHOD

(71) Applicant: FUJITSU LIMITED, Kawasaki-shi, Kanagawa (JP)

(72) Inventor: Kazutomo Tsuji, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 15/003,557

(22) Filed: Jan. 21, 2016

(65) Prior Publication Data

US 2016/0233951 A1 Aug. 11, 2016

(30) Foreign Application Priority Data

Feb. 10, 2015 (JP) ................... 2015-024346

(51) Int. Cl.
*H04B 7/26* (2006.01)
*H04L 25/20* (2006.01)
(Continued)

(52) U.S. Cl.
CPC ....... *H04B 7/2606* (2013.01); *H04B 7/15557* (2013.01); *H04L 25/20* (2013.01);
(Continued)

(58) Field of Classification Search
CPC ... H04B 7/2606; H04B 7/15557; H04L 25/20; H04W 84/047; H04W 88/08; H04W 88/085; H04W 88/10
See application file for complete search history.

(56) References Cited

U.S. PATENT DOCUMENTS

2007/0060047 A1 3/2007 Ono
2013/0003682 A1* 1/2013 Jiang ................. H04W 56/0045
370/329
(Continued)

FOREIGN PATENT DOCUMENTS

JP 06-125286 5/1994
JP 2003-032739 1/2003
(Continued)

*Primary Examiner* — Jae Y Lee
(74) *Attorney, Agent, or Firm* — Fujitsu Patent Center

(57) ABSTRACT

When a first condition is satisfied, a controlling unit selects a first mode in which communication between a C-BBU and a mobile communication terminal is intermediated. When a second condition is satisfied, the controlling unit selects a second mode in which communication between another wireless communication apparatus and the mobile communication terminal is intermediated. In the first mode, an RRH unit receives a wireless signal from the mobile communication terminal, converts the wireless signal into a baseband signal, and transmits the baseband signal to the C-BBU, and receives a baseband signal from the C-BBU, converts the baseband signal into a wireless signal, and transmits the wireless signal to the mobile communication terminal. In the second mode, a repeater unit transfers a signal output from said another wireless communication apparatus to the mobile communication terminal, and transfers a signal output from the mobile communication terminal to said another wireless communication apparatus.

11 Claims, 14 Drawing Sheets

(51) Int. Cl.
*H04B 7/155* (2006.01)
*H04W 36/08* (2009.01)
*H04W 88/08* (2009.01)
*H04W 84/04* (2009.01)
*H04W 88/10* (2009.01)

(52) U.S. Cl.
CPC .......... *H04W 36/08* (2013.01); *H04W 84/047* (2013.01); *H04W 88/08* (2013.01); *H04W 88/085* (2013.01); *H04W 88/10* (2013.01)

(56) References Cited

U.S. PATENT DOCUMENTS

2014/0003264 A1* 1/2014 Shin .................... H04B 7/0689
370/252
2014/0086223 A1* 3/2014 Park .................... H04L 1/0031
370/336
2017/0223689 A1* 8/2017 Son .................... H04W 72/046
370/329

FOREIGN PATENT DOCUMENTS

| JP | 2008-177969 | 7/2008 |
| WO | 2005/034554 | 4/2005 |

* cited by examiner

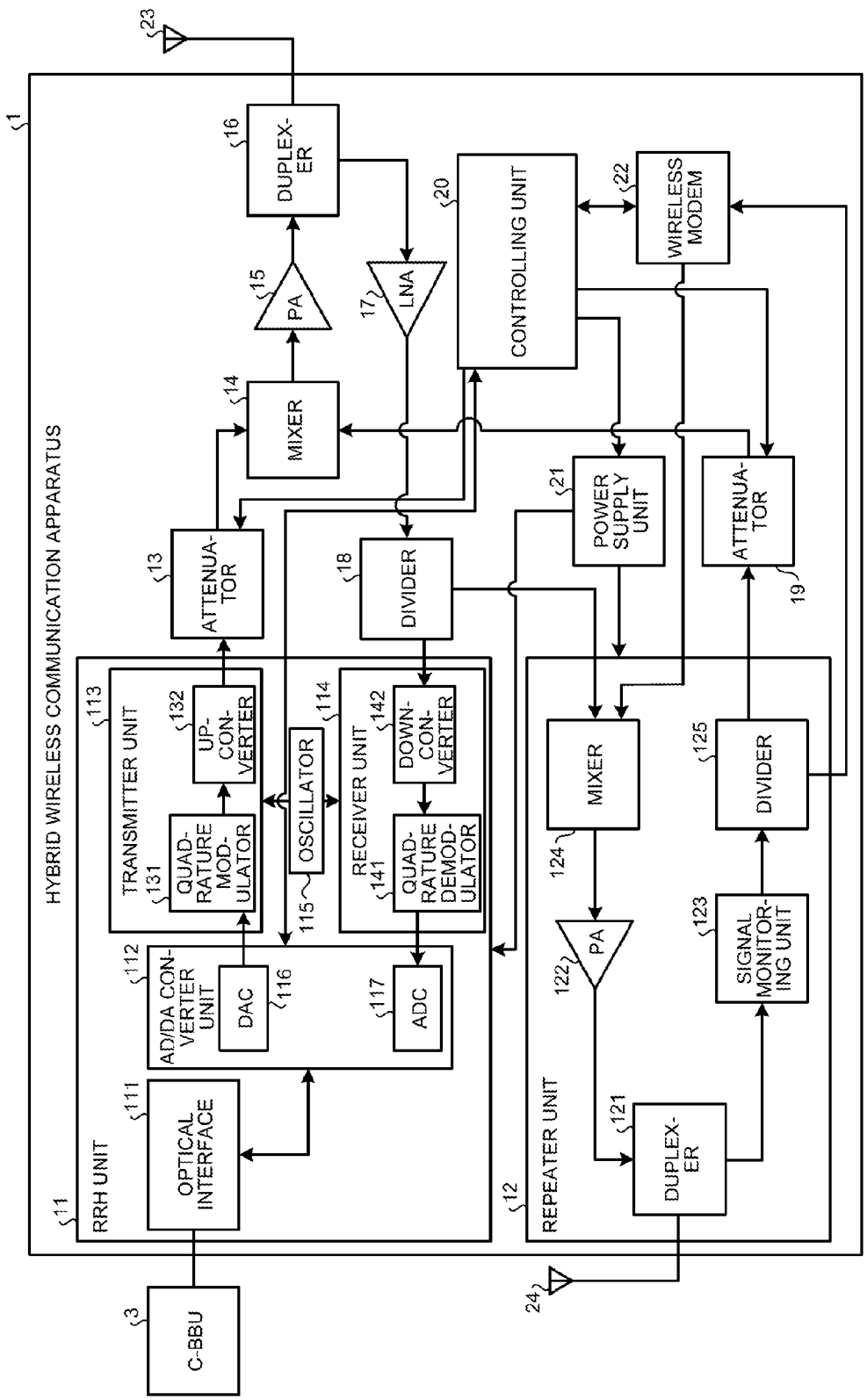

WIRELESS COMMUNICATION APPARATUS, BASE STATION SYSTEM, AND WIRELESS COMMUNICATION APPARATUS CONTROLLING METHOD

CROSS-REFERENCE TO RELATED APPLICATION

This application is based upon and claims the benefit of priority of the prior Japanese Patent Application No. 2015-024346, filed on Feb. 10, 2015, the entire contents of which are incorporated herein by reference.

FIELD

The embodiments discussed herein are related to a wireless communication apparatus, a base station system, and a wireless communication apparatus controlling method.

BACKGROUND

In mobile communication systems in recent years, a separated-type base station apparatus has popularly been used in which the base station apparatus is structured with two devices, namely, a BaseBand Unit (BBU) and a Remote Radio Head (RRH). In this situation, the BBU is a device that connects to a superordinate core network and performs a baseband processing process. The RRH is a device that makes wireless connection to a mobile terminal and amplifies an analog radio signal. Further, as another example of a BBU, a Centralized BaseBand Unit (C-BBU) that is installed so as to centralize in a remote location different from the installment location of an RRH is also popularly used.

Further, in order to enlarge the coverage area of a mobile communication system, a repeater may be used in some situations, besides the base station apparatus. The repeater enlarges the coverage area of the base station by receiving a radio signal from a master base station, amplifying the received radio signal, and transmitting the amplified radio signal. It is determined whether a base station shall be used or a repeater shall be used, depending on the traffic amount and/or the number of users in the coverage area.

When the coverage area of a mobile communication system is enlarged in this manner, a selection is made between using a base station that employs an RRH or the like and using a repeater. When a repeater is used, because no baseband processing device needs to be used, it is possible to omit the communication lines connecting to BBUs and a core network. For this reason, installing a repeater is simpler than installing a base station.

However, because the repeater simply amplifies and transmits the radio signal, the capacity of the mobile communication system itself does not increase. For this reason, when the traffic increases in an area subordinate to the repeater, there is a possibility that the problem of a shortage of capacity may arise, in areas including the coverage area of the master base station.

To cope with this situation, to enlarge the coverage area of a region where traffic of a certain level or larger is, even temporarily, expected, it is desirable to secure the capacity by installing a base station apparatus instead of a repeater.

As additional information, for example, a conventional technique related to a mobile communication system that employs a repeater is known, by which sub-carriers used by a base station apparatus are limited when a repeater is present, so that the repeater performs communication by using sub-carriers that are not used by the base station apparatus. With this arrangement, it is possible to effectively utilize the frequency resources. Further, another conventional technique is also known by which, when a large load is detected at a transmission origin of wireless signals, the output power for re-transmissions by a repeater is lowered.

Patent Document 1: Japanese Laid-open Patent Publication No. 2008-177969
Patent Document 2: International Publication No. WO/2005/034554

However, when base station apparatuses are installed, the base station apparatuses including RRHs are always in operation to secure the coverage area accommodated thereby, even if there is no user subordinate thereto. Thus, the resources used by BBUs and an increase in the electric power consumption may become problems.

SUMMARY

According to an aspect of an embodiment, a wireless communication apparatus includes: a selecting unit that selects a first mode in which communication between a baseband processing device and a mobile communication terminal is intermediated when a first condition is satisfied and that selects a second mode in which communication between another wireless communication apparatus and the mobile communication terminal is intermediated when a second condition is satisfied; a wireless processing unit that, when the selecting unit selects the first mode, receives a wireless signal from the mobile communication terminal, converts the received wireless signal into a baseband signal, and transmits the baseband signal to the baseband processing device, and also, receives a baseband signal from the baseband processing device, converts the received baseband signal into a radio signal, and transmits the radio signal to the mobile communication terminal; and a repeater unit that, when the selecting unit selects the second mode, transfers a signal output from said another wireless communication apparatus to the mobile communication terminal, and also, transfers a signal output from the mobile communication terminal to said another wireless communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a block diagram of a hybrid wireless communication apparatus according to a fourth embodiment.

DESCRIPTION OF EMBODIMENTS

Preferred embodiments of the present invention will be explained with reference to accompanying drawings. The wireless communication apparatus, the base station system, and the wireless communication apparatus controlling method disclosed herein are not limited by the embodiments described below.

[a] First Embodiment

Figure 1:
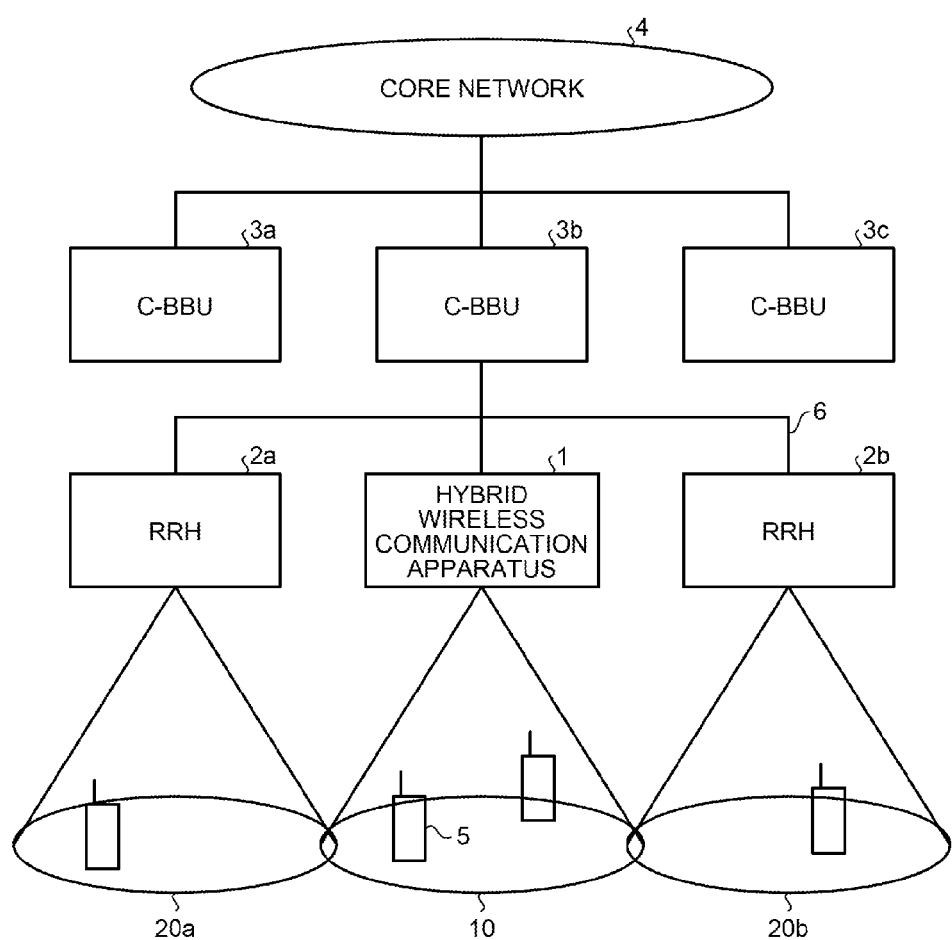
FIG. 1 is a system configuration diagram of a wireless communication system.

An overview of a wireless communication system will be explained, with reference to FIG. 1. FIG. 1 is a system configuration diagram of the wireless communication system. As illustrated in FIG. 1, the wireless communication system includes a hybrid wireless communication apparatus 1, Remote Radio Heads (RRHs) 2a and 2b, Centralized BaseBand Units (C-BBUs) 3a to 3c, a core network 4, and mobile communication terminals 5. In the following sections, when not distinguished from each other, the RRHs 2a and 2b will simply be referred to as "RRHs 2". Similarly, when not distinguished from one another, the C-BBUs 3a to 3c will simply be referred to as "C-BBUs 3".

Figure 2:
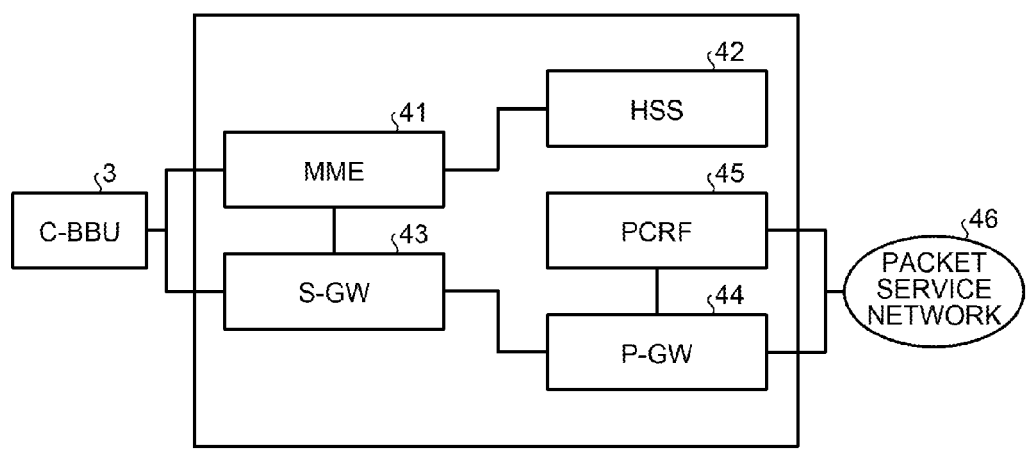
FIG. 2 is a diagram of an example of a core network.

As illustrated in FIG. 2, for example, the core network 4 includes a Mobility Management Entity (MME) 41, a Home Subscriber Server (HSS) 42, a Serving Gateway (S-GW) 43, and a Packet Data Network Gateway (P-GW) 44. Further, the core network 4 includes a Policy Charging Rule Function (PCRF) 45. The MME 41 and the HSS 42 are configured to authenticate the mobile communication terminals 5. Further, the S-GW 43, the P-GW 44, and the PCRF 45 are configured to connect any of the mobile communication terminals 5 to a packet service network 46 such as an Internet Protocol Multimedia Subsystem (IMS) or a Packet Switching Service (PSS). FIG. 2 is a diagram of an example of the core network.

Each of the C-BBU 3 is connected to the core network 4. Further, each of the C-BBUs 3 houses therein the plurality of RRHs 2 and the hybrid wireless communication apparatus 1. In other words, the plurality of RRHs 2 and the plurality of hybrid wireless communication apparatuses 1 are connected to the C-BBUs 3, so that each of the C-BBUs 3 is in charge of a connecting process and a baseband processing process performed on the signals for the RRHs 2 and the hybrid wireless communication apparatus 1 connected thereto. Each of the C-BBUs 3 serves as an example of the "baseband processing device".

The RRHs 2 are connected to the C-BBU 3 by using a Common Public Radio Interface (CPRI). Each of the RRHs 2 has a coverage area. For example, the RRH 2a has a coverage area 20a, whereas the RRH 2b has a coverage area 20b.

Each of the RRHs 2 is configured to perform a wireless communication with any mobile communication terminal 5 that is present in the coverage area thereof. More specifically, an RRH 2 receives a wireless signal from a mobile communication terminal 5. Subsequently, the RRH 2 converts the received wireless signal into a baseband signal by applying a frequency conversion process thereto. After that, the RRH 2 transmits the generated baseband signal to the C-BBU 3 to which the RRH 2 is connected. Further, the RRH 2 receives a baseband signal addressed to the mobile communication terminal 5, from the C-BBU 3. Subsequently, the RRH 2 converts the received baseband signal into a wireless signal. After that, the RRH 2 transmits the generated wireless signal to the mobile communication terminal 5.

The hybrid wireless communication apparatus 1 has a repeater function and an RRH function. The hybrid wireless communication apparatus 1 operates by selecting one from between the repeater function and the RRH function. When operating as a repeater, the hybrid wireless communication apparatus 1 operates in a repeater mode. When operating as an RRH, the hybrid wireless communication apparatus 1 operates in an RRH mode. The RRH mode serves as an example of the "first mode", whereas the repeater mode serves as an example of the "second mode".

The hybrid wireless communication apparatus 1 has a coverage area 10. When a mobile communication terminal 5 is present in the coverage area 10 while the hybrid wireless communication apparatus 1 is in the repeater mode where the repeater function is in operation, the hybrid wireless communication apparatus 1 amplifies a signal received from the mobile communication terminal 5 and transfers the amplified signal to an RRH 2 serving as a master base station. Further, the hybrid wireless communication apparatus 1 amplifies a signal received from the RRH 2 serving as the master base station and transmits the amplified signal to the mobile communication terminal 5. The RRH 2 serving as the master base station is an example of "another wireless communication apparatus".

In contrast, when a mobile communication terminal 5 is present in the coverage area 10 while the hybrid wireless communication apparatus 1 is in the RRH mode where the RRH function is in operation, the hybrid wireless communication apparatus 1 operates in the same manner as the other RRHs 2. The hybrid wireless communication apparatus 1 serves as an example of the "wireless communication apparatus".

While the hybrid wireless communication apparatus 1 is operating in the RRH mode, the mobile communication terminals 5 perform communication while considering the hybrid wireless communication apparatus 1 as a wireless communication apparatus (RRH) of the base station apparatus. In contrast, while the hybrid wireless communication apparatus 1 is operating in the repeater mode, the mobile communication terminals 5 perform communication while considering the RRH 2 as a wireless communication apparatus (RRH) of the base station apparatus via the hybrid wireless communication apparatus 1.

Figure 3:
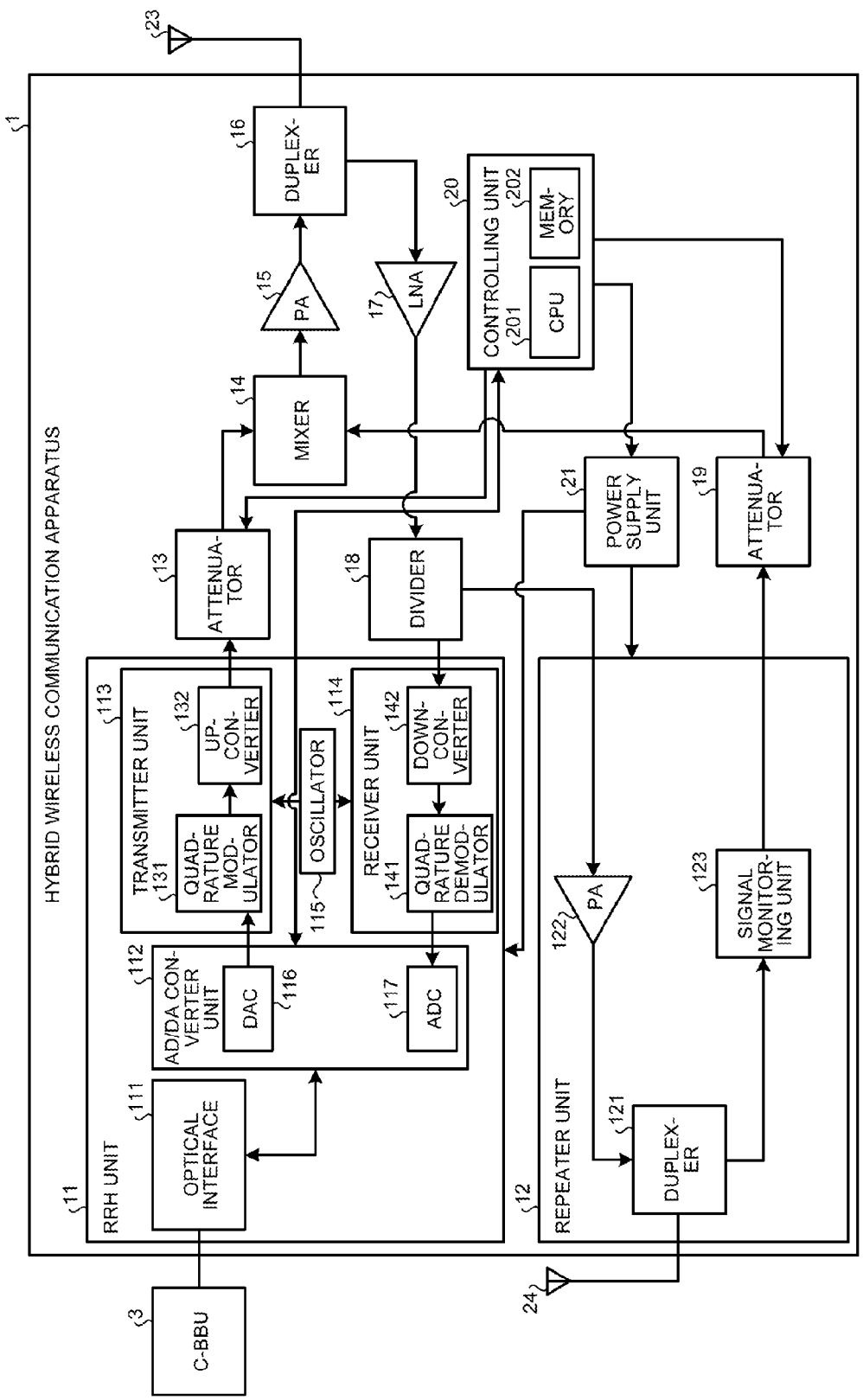
FIG. 3 is a block diagram of a hybrid wireless communication apparatus according to a first embodiment.

Next, details of the hybrid wireless communication apparatus 1 according to the first embodiment will be explained, with reference to FIG. 3. FIG. 3 is a block diagram of the hybrid wireless communication apparatus according to the first embodiment.

As illustrated in FIG. 3, the hybrid wireless communication apparatus 1 according to the first embodiment includes an RRH unit 11 and a repeater unit 12. Further, the hybrid wireless communication apparatus 1 includes an attenuator 13, a mixer 14, a power amplifier (PA) 15, a duplexer 16, a Low Noise Amplifier (LNA) 17, a divider 18, another attenuator 19, and a controlling unit 20. Further, the hybrid wireless communication apparatus 1 includes a terminal-specific antenna 23 used for performing wireless communication with the mobile communication terminals 5 and a base-station-specific antenna 24 used for performing wireless communication with the RRH 2 serving as the master base station.

The RRH unit 11 includes an optical interface 111, an Analog Digital/Digital Analog (AD/DA) converter unit 112, a transmitter unit 113, a receiver unit 114, and an oscillator 115. While the hybrid wireless communication apparatus 1 is operating in the RRH mode, the RRH unit 11 is configured to continuously operate by receiving an electric power from a power supply unit 21 under control of the controlling unit 20. In contrast, while the hybrid wireless communication apparatus 1 is operating in the repeater mode, the RRH unit 11 is configured to shift into a power saving mode under control of the controlling unit 20. In the power saving mode, the optical interface 111 and the AD/DA converter unit 112 operate intermittently by receiving an electric power from the power supply unit 21 at regular intervals. The transmitter unit 113 and the receiver unit 114 stop operating when the supply of electric power is stopped. The RRH unit 11 serves as an example of the "wireless communication unit".

The optical interface 111 is an interface for the communication between the C-BBU 3 and the AD/DA converter unit 112 included in the RRH unit 11. The optical interface 111 is configured to transfer a baseband signal received from the C-BBU 3 to the AD/DA converter unit 112. Further, the optical interface 111 is configured to transfer a baseband signal received from the AD/DA converter unit 112 to the C-BBU 3.

The AD/DA converter unit 112 includes a Digital Analog Converter (DAC) 116 and an Analog Digital Converter (ADC) 117. The AD/DA converter unit 112 is configured to receive the baseband signal from the optical interface 111. After that, the DAC 116 converts the baseband signal, which is a digital signal, into an analog signal. Subsequently, the DAC 116 outputs the analog signal converted from the baseband signal, to the transmitter unit 113.

Further, the ADC 117 is configured to receive a baseband signal from the receiver unit 114. After that, the ADC 117 converts the baseband signal, which is an analog signal, into a digital signal. Subsequently, the AD/DA converter unit 112 outputs the digital signal converted from the baseband signal, to the optical interface 111.

Further, while the hybrid wireless communication apparatus 1 is operating in the RRH mode, the AD/DA converter unit 112 is configured to receive a control signal instructing to switch into the repeater mode, from the C-BBU 3 via the optical interface 111. After that, the AD/DA converter unit 112 outputs the received control signal instructing to switch into the repeater mode, to the controlling unit 20.

Further, while the hybrid wireless communication apparatus 1 is operating in the repeater mode, the AD/DA converter unit 112 is configured to receive a control signal instructing to switch into the RRH mode, from the C-BBU 3 via the optical interface 111. After that, the AD/DA converter unit 112 outputs the received control signal instructing to switch into the RRH mode, to the controlling unit 20.

The transmitter unit 113 includes a quadrature modulator 131 and an up-converter 132. The quadrature modulator 131 is configured to receive an input of the baseband signal from the DAC 116. Subsequently, the quadrature modulator 131 modulates the received baseband signal. After that, the quadrature modulator 131 outputs the modulated signal to the up-converter 132.

The up-converter 132 is configured to receive the input of the modulated signal from the quadrature modulator 131. Subsequently, the up-converter 132 converts the frequency of the modulated signal into a wireless frequency by mixing an output signal from the oscillator 115 therewith. After that, the up-converter 132 outputs the signal having the wireless frequency, to the attenuator 13.

The receiver unit 114 includes a quadrature demodulator 141 and a down-converter 142. The down-converter 142 is configured to receive an input of a signal having a wireless frequency, from the divider 18. Subsequently, the receiver unit 114 generates a baseband signal by performing a frequency conversion process by mixing the received signal with an output signal from the oscillator 115. After that, the down-converter 142 outputs the generated down-converted signal to the quadrature demodulator 141.

The quadrature demodulator 141 is configured to receive the input of the down-converted signal from the down-converter 142. Subsequently, the quadrature demodulator 141 demodulates the received signal. After that, the quadrature demodulator 141 outputs the demodulated baseband signal to the ADC 117.

The repeater unit 12 includes a duplexer 121, a PA 122, and a signal monitoring unit 123. While the hybrid wireless communication apparatus 1 is operating in the repeater mode, the repeater unit 12 is configured to operate continuously by receiving a electric power supply unit 21 under the control of the controlling unit 20. In contrast, while the hybrid wireless communication apparatus 1 is operating in the RRH mode, the repeater unit 12 is configured to stop operating as a result of the electric power being stopped under the control of the controlling unit 20.

The duplexer 121 is configured to receive a signal transmitted from the RRH 2 serving as the master base station, via the base-station-specific antenna 24. After that, the duplexer 121 outputs the received signal to the signal monitoring unit 123. Further, the duplexer 121 is configured to transmit a signal transmitted from the PA 122, to the RRH 2 serving as the master base station, via the base-station-specific antenna 24.

The PA 122 is configured to receive an input of the signal transmitted from the mobile communication terminal 5 from the divider 18. After that, the PA 122 amplifies the received signal. Subsequently, the PA 122 outputs the amplified signal to the duplexer 121.

The signal monitoring unit 123 is configured to receive an input of the signal transmitted from the RRH 2, from the duplexer 121. After that, the signal monitoring unit 123 measures the signal intensity of the received signal. Subsequently, the signal monitoring unit 123 outputs the signal to the attenuator 19.

The attenuator 13 is configured to receive an input of the signal from the transmitter unit 113. The attenuator 13 attenuates the received signal and outputs the attenuated signal to the mixer 14. The attenuation amount for the signal realized by the attenuator 13 can be explained as below.

When the operation mode shifts from the RRH mode into the repeater mode, the attenuator 13 receives an instruction to increase the attenuation amount from the controlling unit 20. After that, the attenuator 13 gradually increases the attenuation amount up to an upper limit, in response to the instruction from the controlling unit 20. In that situation, the attenuator 13 attenuates the signal by using the gradually-increasing attenuation amount. After that, the attenuator 13 outputs the attenuated signal to the mixer 14.

Subsequently, when the shift into the repeater mode has completed, the attenuator 13 attenuates a received signal by using the upper limit of the attenuation amount so as to obtain a sufficiently low output.

In contrast, when the operation mode shifts from the repeater mode into the RRH mode, the attenuator 13 receives an instruction to decrease the attenuation amount from the controlling unit 20. After that, the attenuator 13 gradually decreases the attenuation amount in response to the instruction from the controlling unit 20. In that situation, the attenuator 13 attenuates the signal by using the gradually-decreasing attenuation amount. After that, the attenuator 13 outputs the attenuated signal to the mixer 14.

Subsequently, when the shift into the RRH mode has completed, the attenuator 13 outputs a received signal to the mixer 14, without attenuating the signal.

The attenuator 19 is configured to receive an input of the signal from the signal monitoring unit 123. The attenuator 19 attenuates the received signal and outputs the attenuated signal to the mixer 14. The attenuation amount for the signal realized by the attenuator 19 can be explained as below.

When the operation mode shifts from the RRH mode into the repeater mode, the attenuator 19 receives an instruction to decrease the attenuation amount from the controlling unit 20. After that, the attenuator 19 gradually decreases the attenuation amount, in response to the instruction from the controlling unit 20. In that situation, the attenuator 19 attenuates the signal by using the gradually-decreasing attenuation amount. After that, the attenuator 19 outputs the attenuated signal to the mixer 14.

Subsequently, when the shift into the repeater mode has completed, the attenuator 19 outputs a received signal to the mixer 14, without attenuating the signal.

In contrast, when the operation mode shifts from the repeater mode into the RRH mode, the attenuator 19 receives an instruction to increase the attenuation amount from the controlling unit 20. After that, the attenuator 19 gradually increases the attenuation amount up to an upper limit in response to the instruction from the controlling unit 20. In that situation, the attenuator 19 attenuates the signal by using the gradually-increasing attenuation amount. After that, the attenuator 19 outputs the attenuated signal to the mixer 14.

Subsequently, when the shift into the RRH mode has completed, the attenuator 19 attenuates a received signal by using the upper limit of the attenuation amount so as to obtain a sufficiently low output.

The mixer 14 is configured to receive inputs of the signals each having the wireless frequency from the attenuator 13 and the attenuator 19. After that, the mixer 14 outputs the received signal to the PA 15.

The PA 15 is configured to receive an input of the signal having the wireless frequency from the mixer 14. After that, the PA 15 amplifies the received signal. Subsequently, the PA 15 outputs the amplified signal to the duplexer 16.

The duplexer 16 is configured to receive an input of the signal having the wireless frequency from the PA 15. After that, the duplexer 16 transmits the received signal to the mobile communication terminal 5 via the terminal-specific antenna 23.

Further, the duplexer 16 is configured to receive an input of the signal transmitted from the mobile communication terminal 5 via the terminal-specific antenna 23. After that, the duplexer 16 outputs the received signal to the LNA 17.

The LNA 17 is configured to receive an input of the signal transmitted from the mobile communication terminal 5, from the duplexer 16. After that, the LNA 17 amplifies the received signal. Subsequently, the LNA 17 outputs the amplified signal to the divider 18.

The divider 18 is configured to receive an input of the signal transmitted from the mobile communication terminal 5 from the LNA 17. After that, the divider 18 outputs the received signal to the receiver unit 114 and the PA 122.

The controlling unit 20 includes a Central Processing Unit (CPU) 201 and a memory 202. The controlling unit 20 is configured to perform the processes described below, by employing the CPU 201 and the memory 202.

When the traffic amount of the communication between the hybrid wireless communication apparatus 1 and the mobile communication terminals 5 that are present in the coverage area 10 becomes smaller than a repeater threshold value set in advance, the controlling unit 20 receives an input of a control signal instructing to switch into the repeater mode, from the AD/DA converter unit 112.

When having received the control signal instructing to switch into the repeater mode, the controlling unit 20 instructs a power supply unit 21 to supply electric power to the repeater unit 12. The controlling unit 20 thus causes the repeater unit 12 to start operating. Subsequently, the controlling unit 20 instructs the attenuator 13 to increase the attenuation amount. Further, the controlling unit 20 instructs the attenuator 19 to decrease the attenuation amount.

When the attenuation amount of the attenuator 13 has reached the upper limit and the attenuation amount of the attenuator 19 has completed decreasing, the controlling unit 20 notifies the C-BBU 3 of a disconnection of a CPRI 6. After that, the controlling unit 20 instructs the power supply unit 21 to supply electric power to the RRH unit 11 in a power saving mode. In this manner, the controlling unit 20 shifts the RRH unit 11 into the power saving mode and causes the optical interface 111 and the AD/DA converter unit 112 to operate intermittently.

In that situation, because the output of the RRH unit 11 gradually decreases, the mobile communication terminals 5 that have been using the hybrid wireless communication apparatus 1 as the wireless communication apparatus (RRH) of the base station gradually executes handovers. The mobile communication terminals 5 may select another RRH 2 as a handover destination or may select the RRH 2 serving as the master base station via the repeater unit 12 as a handover destination.

As explained above, when the traffic amount of the hybrid wireless communication apparatus 1 operating in the RRH mode has decreased, the controlling unit 20 changes the operation mode into the repeater mode and causes the RRH unit 11 to operate intermittently. As a result, when the traffic amount is small, the hybrid wireless communication apparatus 1 is able to reduce the electric power consumption, while guaranteeing the coverage area.

In contrast, when the traffic amount of the communication of the RRH 2 serving as the master base station of the hybrid wireless communication apparatus 1 becomes equal to or larger than an RRH threshold value, the controlling unit 20 receives an input of the control signal instructing to switch into the RRH mode, from the AD/DA converter unit 112 operating intermittently.

When having received the control signal instructing to switch into the RRH mode, the controlling unit 20 instructs the power supply unit 21 to start supplying electric power to the RRH unit 11. In this manner, the controlling unit 20 shifts the RRH unit 11 into a continuous operation. Subsequently, the controlling unit 20 establishes a connection with the C-BBU 3 that uses the CPRI 6.

Further, the controlling unit 20 instructs the attenuator 13 to decrease the attenuation amount. Also, the controlling unit 20 instructs the attenuator 19 to increase the attenuation amount.

When the attenuation amount of the attenuator 19 has reached the upper limit, and the attenuation amount of the attenuator 13 has completed decreasing, the controlling unit 20 instructs the power supply unit 21 to stop supplying the electric power to the repeater unit 12. In this manner, the controlling unit 20 causes the repeater unit 12 to stop operating.

As explained above, when the traffic amount of the hybrid wireless communication apparatus 1 operating in the repeater mode has increased, the controlling unit 20 changes the operation mode into the RRH mode and starts up the RRH unit 11 so as to bring the RRH function into operation. As a result, when the traffic amount is large, the hybrid wireless communication apparatus 1 is able to guarantee both the capacity and the coverage area. The controlling unit 20 serves as an example of the "selecting unit".

Figure 4:
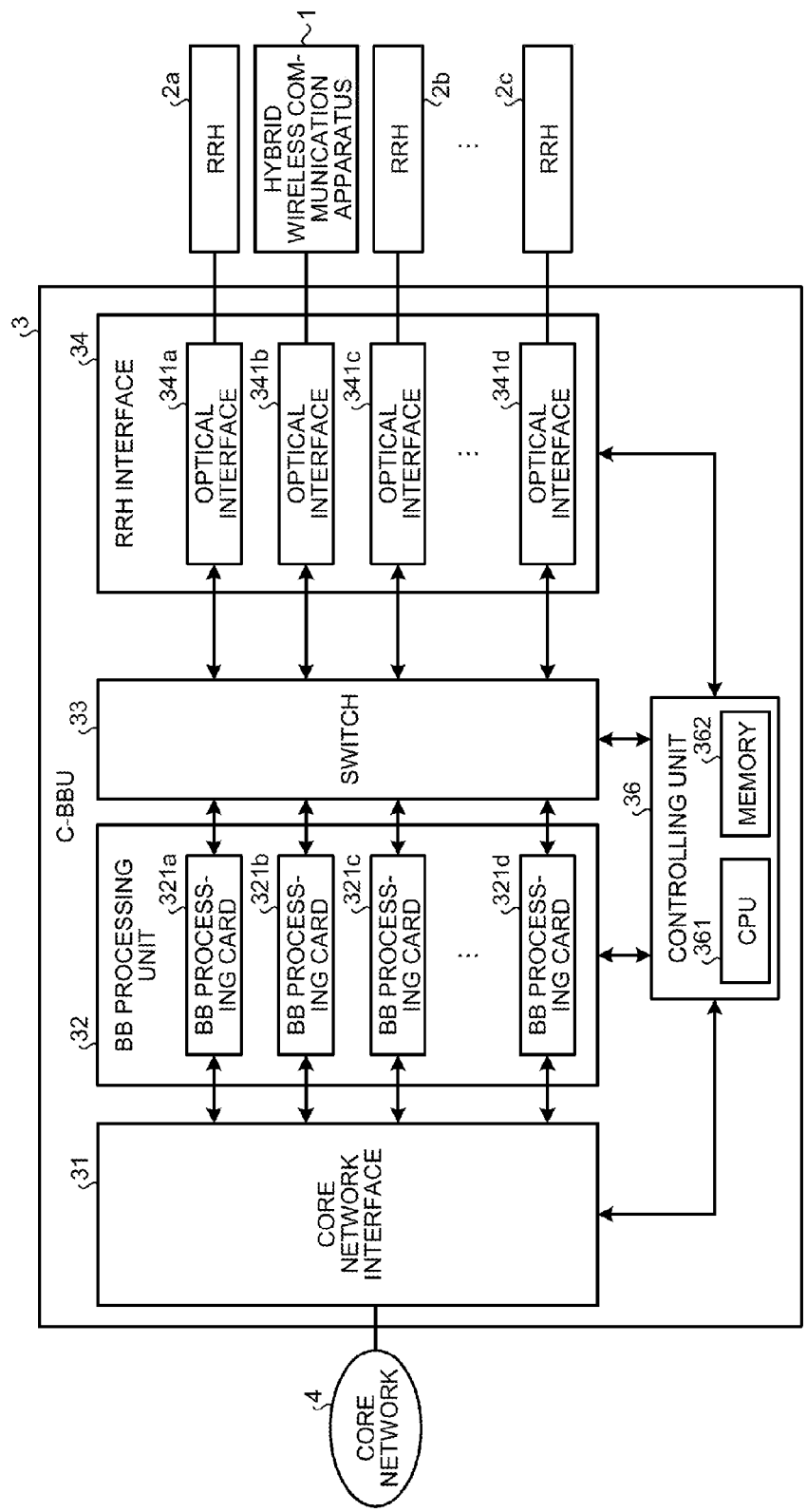
FIG. 4 is a block diagram of a C-BBU.

Next, details of the C-BBU 3 according to the first embodiment will be explained, with reference to FIG. 4. FIG. 4 is a block diagram of the C-BBU.

The C-BBU 3 includes a core network interface 31, a BaseBand (BB) processing unit 32, a switch 33, an RRH interface 34, and a controlling unit 36.

The BB processing unit 32 includes BB processing cards 321a to 321d. The BB processing cards 321a to 321d have the same functions as one another. Thus, in the following sections, when not distinguished from one another, the BB processing cards 321a to 321d will simply be referred to as "BB processing cards 321".

Further, the RRH interface 34 includes optical interfaces 341a to 341d. The optical interfaces 341a to 341d have the same functions as one another. Thus, in the following sections, when not distinguished from one another, the optical interfaces 341a to 341d will simply be referred to as "optical interfaces 341".

The core network interface 31 is an interface used for the communication between the core network 4 and the C-BBU 3. Also, the core network interface 31 has a switching function to switch between the paths that connect the core network 4 and the BB processing cards 321 together.

The core network interface 31 is configured to receive an input of a signal from the core network 4. After that, the core network interface 31 receives an instruction to switch between the paths from the controlling unit 36. Subsequently, the core network interface 31 outputs the signal received from the core network 4 to one of the BB processing cards 321 indicated in the instruction.

Each of the BB processing cards 321 is allocated by the controlling unit 36 to a different one from among the RRHs 2 and the hybrid wireless communication apparatus 1. In this situation, the hybrid wireless communication apparatus 1 is allocated to one of the BB processing cards 321 in the situation where the hybrid wireless communication apparatus 1 is operating in the RRH mode.

Each of the BB processing cards 321 is configured to receive an input of a baseband signal addressed to the allocated apparatus, from the core network interface 31. After that, each of the BB processing cards 321 performs an encoding process and a modulating process on the baseband signal. Subsequently, each of the BB processing cards 321 outputs the baseband signal on which the processes have been performed, to the switch 33.

Further, each of the BB processing cards 321 is configured to receive an input of a baseband signal transmitted from the allocated apparatus, from the switch 33. After that, each of the BB processing cards 321 applies a demodulating process and a decoding process on the baseband signal. Subsequently, each of the BB processing cards 321 outputs the baseband signal on which the processes have been performed, to the core network interface 31.

Further, when the hybrid wireless communication apparatus 1 is allocated to any of the BB processing cards 321, the BB processing card 321 stops operating in response to the control of the controlling unit 36 that stops the supply of the electric power, when the hybrid wireless communication apparatus 1 allocated thereto has shifted into the repeater mode. As a result, it is possible to allocate the BB processing card 321 to another apparatus and to thus able to effectively utilize the resource of the C-BBU 3.

In contrast, when the hybrid wireless communication apparatus 1 has shifted into the RRH mode, the BB processing card 321 starts up in response to the control of the controlling unit 36 that starts the supply of electric power. As a result, the hybrid wireless communication apparatus 1 is able to promptly start the communication after the shift into the RRH mode. The BB processing card 321 serves an example of the "baseband processing unit".

Each of the optical interfaces 341 is connected to a different one from among the RRHs 2 and the hybrid wireless communication apparatus 1. For example, in FIG. 4, the optical interface 341a is connected to the RRH 2a; the optical interface 341b is connected to the hybrid wireless communication apparatus 1; the optical interface 341c is connected to the RRH 2b; and the optical interface 341d is connected to the RRH 2c.

Further, the optical interface 341 connected to the hybrid wireless communication apparatus 1 stops operating in response to the control of the controlling unit 36 that stops the supply of the electric power, when the hybrid wireless communication apparatus 1 has shifted into the repeater mode. As a result, it is possible to stop the optical interface 341 that does not perform any communication while the hybrid wireless communication apparatus 1 connected thereto is in the repeater mode. It is therefore possible to reduce the electric power consumption.

The switch 33 is a switch configured to switch between the connections established between the BB processing cards 321 included in the BB processing unit 32 and the optical interfaces 341 included in the RRH interface 34. In response to an instruction from the controlling unit 36, the switch 33 is configured to transfer a baseband signal received from any of the BB processing cards 321 to the optical interface 341 connected to the apparatus allocated to the BB processing card 321. Further, in response to an instruction from the controlling unit 36, the switch 33 is configured to transfer a baseband signal received from any of the optical interfaces 341 to the BB processing card 321 allocated to the apparatus from which the baseband signal was transmitted.

The controlling unit 36 includes a CPU 361 and a memory 362. The controlling unit 36 performs the processes described below, by employing the CPU 361 and the memory 362.

The controlling unit 36 is configured to control the core network interface 31, the BB processing unit 32, the switch 33, and the RRH interface 34. Details of operations of the controlling unit 36 will be explained below.

The controlling unit 36 allocates the BB processing cards 321 to the RRHs 2 and the hybrid wireless communication apparatus 1 connected to the optical interfaces 341. For example, the controlling unit 36 allocates each of the BB processing cards 321 to a different one from among the RRHs 2 and the hybrid wireless communication apparatus 1 that are started up initially. After that, when the capacity of any of the BB processing cards 321 is exceeded, the controlling unit 36 allocates another BB processing card 321 to the apparatus allocated to the over-capacity BB processing card.

When a signal is transmitted from the core network 4 to a mobile communication terminal 5, the controlling unit 36 obtains the address of the signal received by the core network interface 31. The address is information indicating to which mobile communication terminal 5 the signal is to be transmitted, via which one from among the RRHs 2 and the hybrid wireless communication apparatus 1. Further, the controlling unit 36 controls the core network interface 31 so that the signal is transferred to the BB processing card 321 allocated to the apparatus to which the signal is addressed. Further, the controlling unit 36 controls the switch 33 so that an output of the BB processing card 321 to which the signal was sent is transmitted to the optical interface 341 connected to the apparatus allocated to the BB processing card 321.

When a signal is to be transmitted from a mobile communication terminal 5 to the core network 4, the controlling unit 36 acquires the transmission origin of the signal that is input to the optical interface 341. The transmission origin is information indicating which one among the RRHs 2 and the hybrid wireless communication apparatus 1 sent the signal. Further, the controlling unit 36 controls the switch 33 so that the signal is transferred to the BB processing card 321 allocated to the apparatus determined as the transmission origin of the signal. Further, the controlling unit 36 controls the core network interface 31 so that an output of the BB processing card 321 to which the signal was sent is transmitted to the core network 4.

Further, the controlling unit 36 stores therein the repeater threshold value used for switching the hybrid wireless communication apparatus 1 from the RRH mode into the repeater mode and the RRH threshold value used for switching the hybrid wireless communication apparatus 1 from the repeater mode into the RRH mode. The repeater threshold value serves as an example of the "first predetermined value" and the "first threshold value". The RRH threshold value serves as an example of the "second predetermined value" and the "second threshold value".

Further, the controlling unit 36 stores therein the operation mode of the hybrid wireless communication apparatus 1 connected to the C-BBU 3 of its own. As explained below, because the controlling unit 36 designates the operation mode of the hybrid wireless communication apparatus 1, the controlling unit 36 is able to find out the operation mode of the hybrid wireless communication apparatus 1.

Further, the controlling unit 36 stores therein information about the RRH 2 serving as the master base station of the hybrid wireless communication apparatus 1 operating in the repeater mode. For example, the RRH 2 that serves as the master base station while the hybrid wireless communication apparatus 1 is operating in the repeater mode is determined in advance. Thus, the controlling unit 36 stores therein the combinations.

The controlling unit 36 obtains the traffic amount processed by each of the BB processing cards 321. For example, the controlling unit 36 is able to obtain the traffic amount processed by each of the BB processing cards 321 by storing therein information about the BB processing cards 321 serving as the addresses of the signals received by the core network interface 31 and calculating a total.

Further, when the traffic amount processed by the BB processing card 321 allocated to the hybrid wireless communication apparatus 1 becomes smaller than the repeater threshold value, the controlling unit 36 identifies the optical interface 341 connected to the hybrid wireless communication apparatus 1. After that, the controlling unit 36 transmits a control signal instructing to switch into the repeater mode, to the hybrid wireless communication apparatus 1 via the identified optical interface 341 and the CPRI 6.

Subsequently, when having received a notification about a disconnection of the CPRI 6 from the hybrid wireless communication apparatus 1, the controlling unit 36 shifts the optical interface 341 connected to the hybrid wireless communication apparatus 1 into an intermittent operation. Further, the controlling unit 36 cancels the allocation of the resource to the BB processing card 321 allocated to the hybrid wireless communication apparatus 1. After that, the controlling unit 36 stops the supply of the electric power to the BB processing card 321 of which the resource was released.

As explained above, when the traffic amount of the hybrid wireless communication apparatus 1 operating in the RRH mode has decreased, the controlling unit 36 changes the operation mode into the repeater mode, cancels the allocation of the resource to the BB processing card 321, and causes the optical interface 341 to operate intermittently. As a result, when the traffic amount is small, it is possible to guarantee the coverage area by using the hybrid wireless communication apparatus 1 operating in the repeater mode. At the same time, it is possible to improve the efficiency in using the resources at the C-BBU 3 and to reduce the electric power consumption.

Next, an example will be explained in which the traffic amount processed by the BB processing card 321 allocated to the RRH 2 serving as the master base station of the hybrid wireless communication apparatus 1 operating in the repeater mode becomes equal to or larger than the RRH threshold value. In that situation, the controlling unit 36 identifies the optical interface 341 connected to the hybrid wireless communication apparatus 1 that is operating in the repeater mode and that uses the RRH 2 as the master base station thereof. Subsequently, the controlling unit 36 shifts the identified optical interface 341 into a continuous operation. After that, the controlling unit 36 transmits a control signal instructing to switch into the RRH mode, to the hybrid wireless communication apparatus 1 via the identified optical interface 341 and the CPRI 6. Further, the controlling unit 36 allocates the resource for the BB processing card 321 to the hybrid wireless communication apparatus 1.

As explained above, when the traffic amount of the hybrid wireless communication apparatus 1 operating in the repeater mode has increased, the controlling unit 36 changes the operation mode into the RRH mode, starts up the optical interface 341, and allocates the BB processing card 321 thereto. As a result, when the traffic amount is large, it is possible to guarantee both the capacity and the coverage area by using the hybrid wireless communication apparatus 1 operating in the RRH mode.

Figure 5:
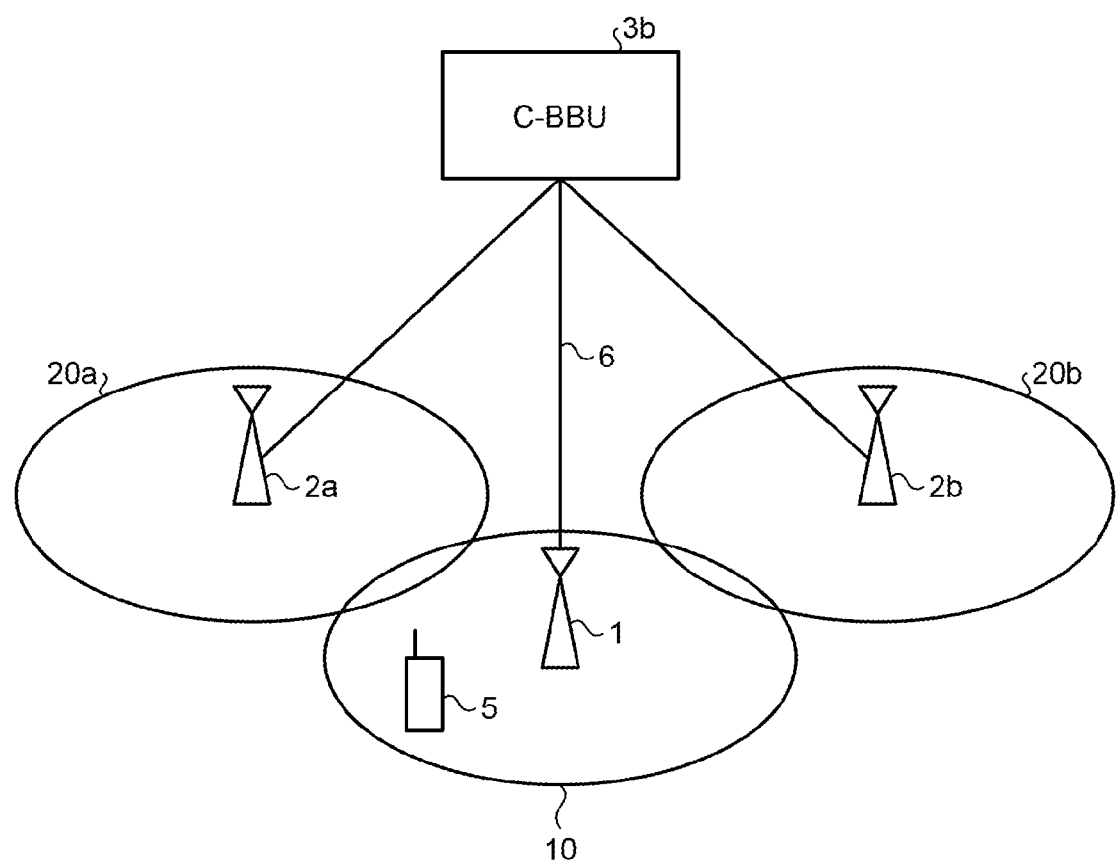
FIG. 5 is a drawing of an operational state observed while the hybrid wireless communication apparatus is operating in an RRH mode.
Figure 6:
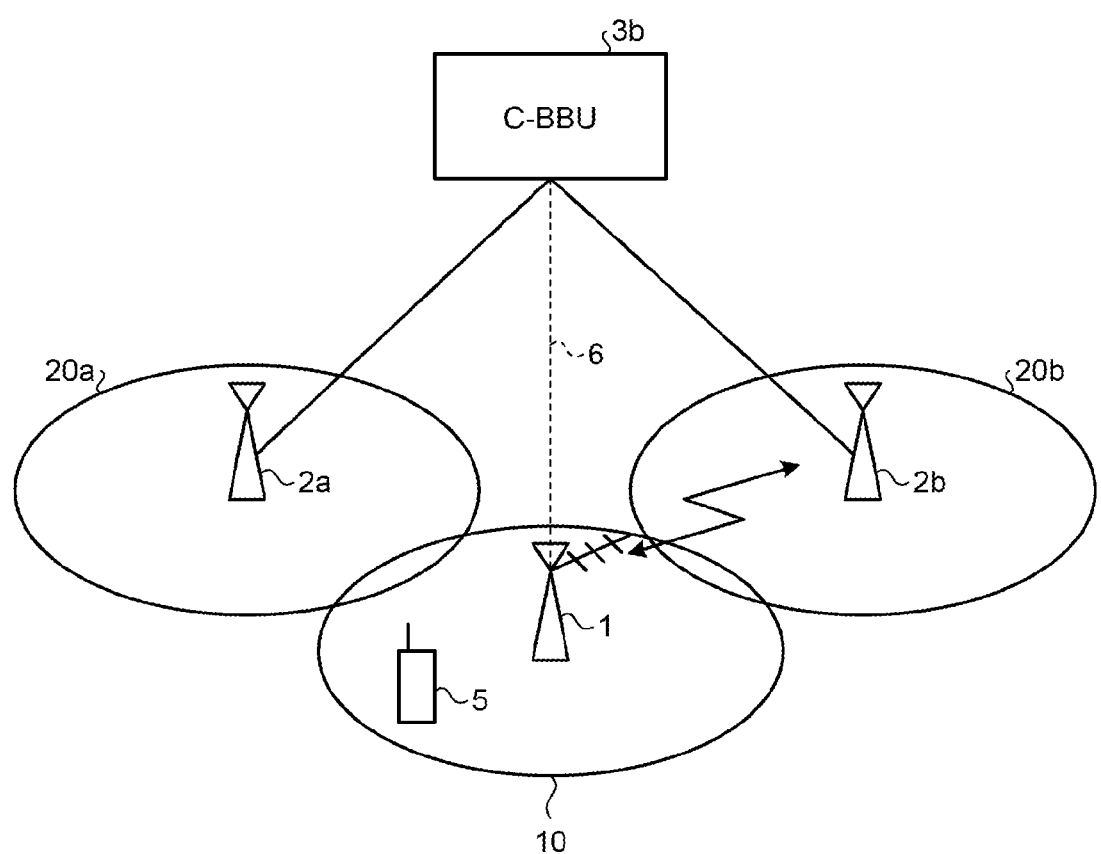
FIG. 6 is a drawing of an operational state observed while the hybrid wireless communication apparatus is operating in a repeater mode.

Next, a communication relationship when the hybrid wireless communication apparatus 1 operates in the RRH mode or the repeater mode will be explained, with reference to FIGS. 5 and 6. FIG. 5 is a drawing of an operational state observed while the hybrid wireless communication apparatus is operating in the RRH mode. FIG. 6 is a drawing of an operational state observed while the hybrid wireless communication apparatus is operating in the repeater mode.

While the hybrid wireless communication apparatus 1 is operating in the RRH mode, the C-BBU 3b and the hybrid wireless communication apparatus 1 are connected to each other at all times (hereinafter, "full-time connection") via the CPRI 6, as illustrated in FIG. 5. Further, the mobile communication terminal 5 that is present in the coverage area 10 transmits a signal to the C-BBU 3b via the hybrid wireless communication apparatus 1.

In that situation, because the C-BBU 3b includes the BB processing card 321 allocated to the hybrid wireless communication apparatus 1 having the coverage area 10, the capacity corresponding to the BB processing card 321 is secured. In other words, in the state illustrated in FIG. 5, the capacity corresponding to the BB processing cards 321 allocated to the hybrid wireless communication apparatus 1 and the RRHs 2a and 2b are secured, while the areas 20a, 20b, and 10 are secured as coverage areas.

In contrast, while the hybrid wireless communication apparatus 1 is operating in the repeater mode, the full-time connection via the CPRI 6 between the C-BBU 3b and the hybrid wireless communication apparatus 1 is not maintained, as illustrated in FIG. 6. Further, the mobile communication terminal 5 that is present in the coverage area 10 transmits a signal to the RRH 2b via the hybrid wireless communication apparatus 1 and transmits a signal to the C-BBU 3b via the RRH 2b.

In that situation, because no BB processing card 321 is allocated to the hybrid wireless communication apparatus 1, the capacity is smaller than the capacity illustrated in FIG. 5 by the capacity corresponding to the BB processing card 321. In other words, in the situation illustrated in FIG. 6, although the areas 20a, 20b, and 10 are secured as coverage areas in the same manner as in FIG. 5, only the capacity corresponding to the BB processing cards 321 allocated the RRHs 2a and 2b is secured.

Figure 7:
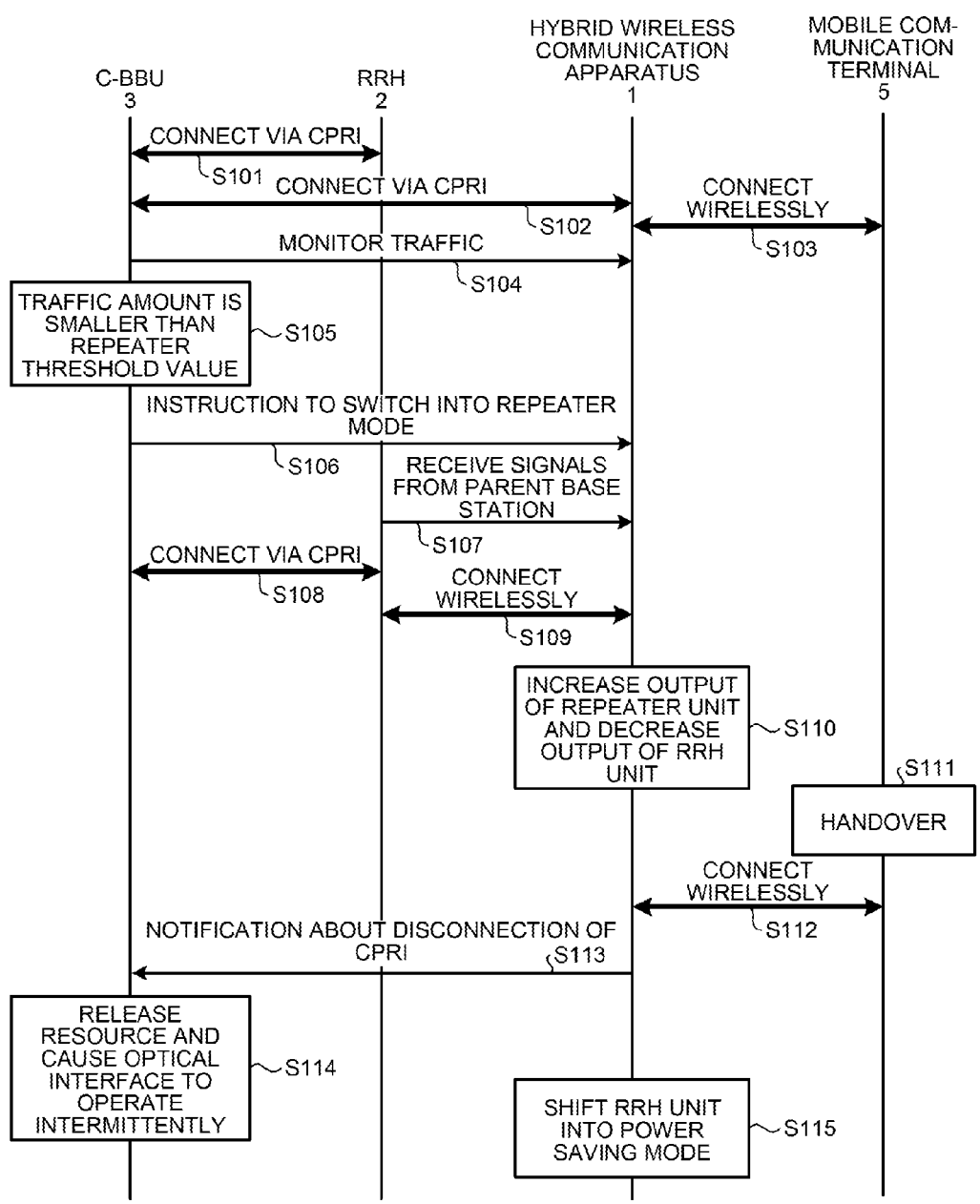
FIG. 7 is a sequence chart of a switching process from the RRH mode into the repeater mode performed in a wireless communication system according to the first embodiment.

Next, a procedure of switching from the RRH mode into the repeater mode in the wireless communication system according to the first embodiment will be explained, with reference to FIG. 7. FIG. 7 is a sequence chart of the switching process from the RRH mode into the repeater mode performed in the wireless communication system according to the first embodiment. In FIG. 7, the lapse of time is expressed downward.

Before the switching, the RRH 2 is connected to the C-BBU 3 via the CPRI 6 (step S101). Further, the hybrid wireless communication apparatus 1 is operating in the RRH mode and is connected to the C-BBU 3 via the CPRI 6 (step S102). Further, the mobile communication terminal 5 is present in the coverage area 10 and is wirelessly connected to the hybrid wireless communication apparatus 1 through the RRH unit 11 (step S103).

The controlling unit 36 included in the C-BBU 3 monitors the traffic of the hybrid wireless communication apparatus 1 by monitoring transmission signals to the hybrid wireless communication apparatus 1 (step S104).

Further, the controlling unit 36 judges whether or not the traffic amount of the hybrid wireless communication apparatus 1 is smaller than the repeater threshold value (step S105). Let us discuss the situation where the traffic amount is smaller than the repeater threshold value.

The controlling unit 36 transmits a control signal instructing to switch into the repeater mode, to the hybrid wireless communication apparatus 1. The controlling unit 20 included in the hybrid wireless communication apparatus 1 receives the control signal instructing to switch into the repeater mode, from the C-BBU 3 (step S106).

After that, the repeater unit 12 starts receiving signals from the RRH 2 serving as a master base station (step S107).

The RRH 2 serving as the master base station continues the connection to the C-BBU 3 established via the CPRI 6 (step S108).

The hybrid wireless communication apparatus 1 connects, through wireless communication, to the RRH 2 serving as the master base station, via the repeater unit 12 (step S109).

Subsequently, the controlling unit 20 decreases the output of the RRH unit 11 by increasing the attenuation amount of the attenuator 13. Further, the controlling unit 20 increases the output of the repeater unit 12, by decreasing the attenuation amount of the attenuator 19 (step S110).

Because the intensity of the receiving signal becomes lower due to the decreased output of the RRH unit 11, the mobile communication terminal 5 performs a handover process (step S111). In the present example, a situation will be explained in which the mobile communication terminal 5 performs a handover to the hybrid wireless communication apparatus 1 that has shifted into the repeater mode.

The mobile communication terminal 5 performs the handover process and wirelessly connects to the hybrid wireless communication apparatus 1 through the repeater unit 12 (step S112). In that situation, the mobile communication terminal 5 transmits a signal to the RRH 2 via the hybrid wireless communication apparatus 1, whereas the RRH 2 transmits the signal received from the mobile communication terminal 5 to the C-BBU 3.

When the attenuation amount of the attenuator 13 has reached the upper limit, the controlling unit 20 transmits a notification about a disconnection of the CPRI 6, to the controlling unit 36 included in the C-BBU 3 (step S113).

When having received the notification about the disconnection of the CPRI 6, the controlling unit 36 included in the C-BBU 3 cancels the allocation of the BB processing card 321 allocated to the hybrid wireless communication apparatus 1 and releases the resource. Further, the controlling unit 36 causes the optical interface 341 connected to the hybrid wireless communication apparatus 1 to operate intermittently (step S114).

The controlling unit 20 included in the hybrid wireless communication apparatus 1 causes the RRH unit 11 to operate in the power saving mode (step S115).

Figure 8:
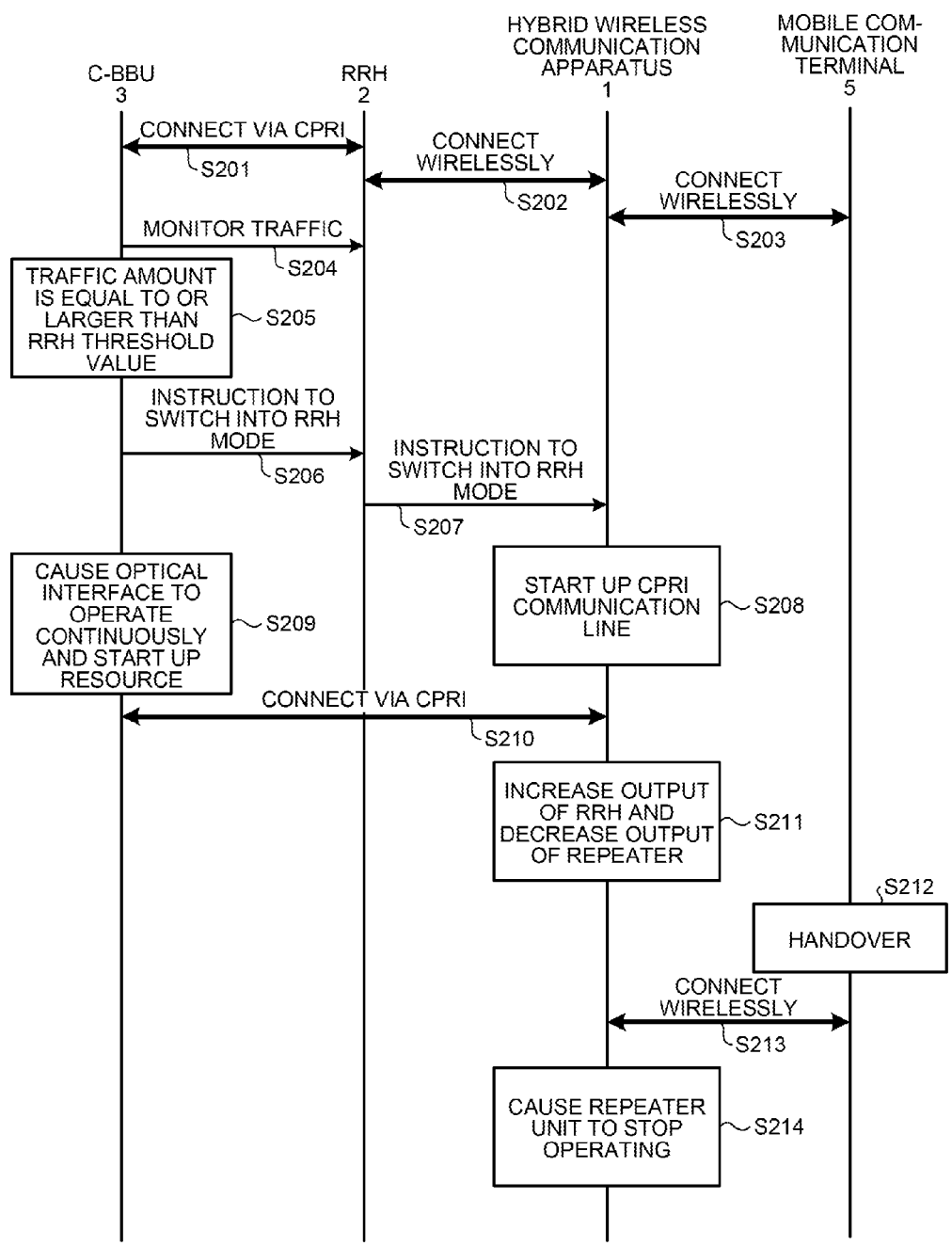
FIG. 8 is a sequence chart of a switching process from the repeater mode into the RRH mode performed in the wireless communication system according to the first embodiment.

Next, a procedure of switching from the repeater mode into the RRH mode in the wireless communication system according to the first embodiment will be explained, with reference to FIG. 8. FIG. 8 is a sequence chart of the switching process from the repeater mode into the RRH mode performed in the wireless communication system according to the first embodiment. In FIG. 8, the lapse of time is expressed downward.

Before the switching, the RRH 2 is connected to the C-BBU 3 via the CPRI 6 (step S201). Further, the hybrid wireless communication apparatus 1 is operating in the repeater mode and is wirelessly connected to the RRH 2 serving as a master base station (step S202). Further, the mobile communication terminal 5 is present in the coverage area 10 and is wirelessly connected to the hybrid wireless communication apparatus 1 through the repeater unit 12 (step S203).

The controlling unit 36 included in the C-BBU 3 monitors the traffic of the RRH 2 by monitoring transmission signals to the RRH 2 serving as the master base station of the hybrid wireless communication apparatus 1 (step S204).

Further, the controlling unit 36 judges whether or not the traffic amount of the RRH 2 is equal to or larger than the RRH threshold value (step S205). Let us discuss the situation where the traffic amount is equal to or larger than the RRH threshold value.

The controlling unit 36 transmits a control signal instructing the hybrid wireless communication apparatus 1 to switch into the RRH mode, to the RRH 2 (step S206).

The RRH 2 transfers the control signal instructing to switch into the RRH mode to the hybrid wireless communication apparatus 1. The controlling unit 20 included in the hybrid wireless communication apparatus 1 receives the control signal instructing to switch into the RRH mode, from the RRH 2 (step S207).

The controlling unit 20 starts up the connection of the CPRI 6 to connect to the C-BBU 3 (step S208).

The controlling unit 36 included in the C-BBU 3 shifts the optical interface 341 connected to the hybrid wireless communication apparatus 1 into a continuous operation. Further, the controlling unit 36 allocates the BB processing card 321 to the hybrid wireless communication apparatus 1 requesting a connection via the CPRI 6 and starts up the resource (step S209).

The RRH unit 11 connects to the C-BBU 3 via the CPRI 6 (step S210).

Subsequently, the controlling unit 20 increases the output of the RRH unit 11, by decreasing the attenuation amount of the attenuator 13. Further, the controlling unit 20 decreases the output of the repeater unit 12, by increasing the attenuation amount of the attenuator 19 (step S211).

Because the intensity of the receiving signal becomes lower due to the decreased output of the repeater unit 12, the mobile communication terminal 5 that has been connected to the hybrid wireless communication apparatus 1 by using the repeater unit 12 performs a handover process (step S212). In the present example, a situation will be explained in which the mobile communication terminal 5 performs a handover to the hybrid wireless communication apparatus 1 that has shifted into the RRH mode.

As a result of the handover process, the mobile communication terminal 5 wirelessly connects to the hybrid wireless communication apparatus 1 by using the RRH unit 11 (step S213).

When the attenuation amount of the attenuator 19 has reached a upper limit, the controlling unit 20 causes the repeater unit 12 to stop operating by exercising control so as to stop the supply of the electric power to the repeater unit 12 (step S214).

Figure 9:
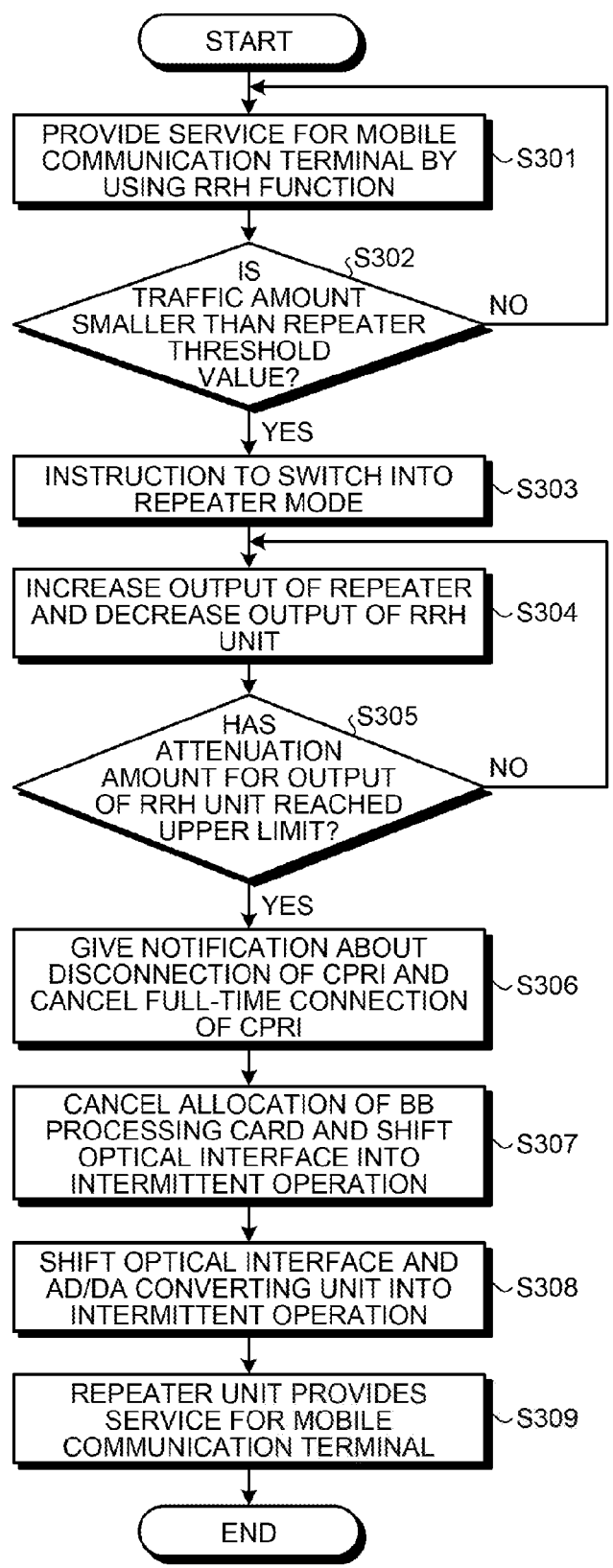
FIG. 9 is a flowchart of a process performed in a communication system according to the first embodiment to change from the RRH mode into the repeater mode.

Next, a flow in a process performed in the communication system according to the first embodiment to change from the RRH mode into the repeater mode will be explained, with reference to FIG. 9. FIG. 9 is a flowchart of the process performed in the communication system according to the first embodiment to change from the RRH mode into the repeater mode.

The RRH unit 11 included in the hybrid wireless communication apparatus 1 provides a service for the mobile communication terminal 5 (step S301).

The controlling unit 36 included in the C-BBU 3 judges whether or not the traffic amount of the hybrid wireless communication apparatus 1 is smaller than the repeater threshold value (step S302). When the traffic amount is equal to or larger than the repeater threshold value (step S302: No), the controlling unit 36 returns to step S301.

On the contrary, when the traffic amount is smaller than the repeater threshold value (step S302: Yes), the controlling unit 36 transmits a control signal instructing to switch into the repeater mode, to the controlling unit 20 (step S303).

In response to the instruction to switch into the repeater mode, the controlling unit 20 increases the output of the repeater unit 12 and decreases the output of the RRH unit 11 (step S304).

The controlling unit 20 judges whether or not the attenuation amount for the output of the RRH unit 11 has reached the upper limit (step S305). When the attenuation amount has not reached the upper limit (step S305: No), the controlling unit 20 returns to step S304.

On the contrary, when the attenuation amount has reached the upper limit (step S305: Yes), the controlling unit 20 notifies the C-BBU 3 of a disconnection of the CPRI 6. After that, the controlling unit 20 cancels the full-time connection of the CPRI 6 (step S306).

The controlling unit 36 included in the C-BBU 3 cancels the allocation of the hybrid wireless communication apparatus 1 to the BB processing card 321, and also, shifts the optical interface 341 into an intermittent operation (step S307).

The controlling unit 20 shifts the optical interface 111 and the AD/DA converter unit 112 included in the RRH unit 11 into an intermittent operation (step S308).

The repeater unit 12 included in the hybrid wireless communication apparatus 1 provides a service for the mobile communication terminal 5 (step S309).

Figure 10:
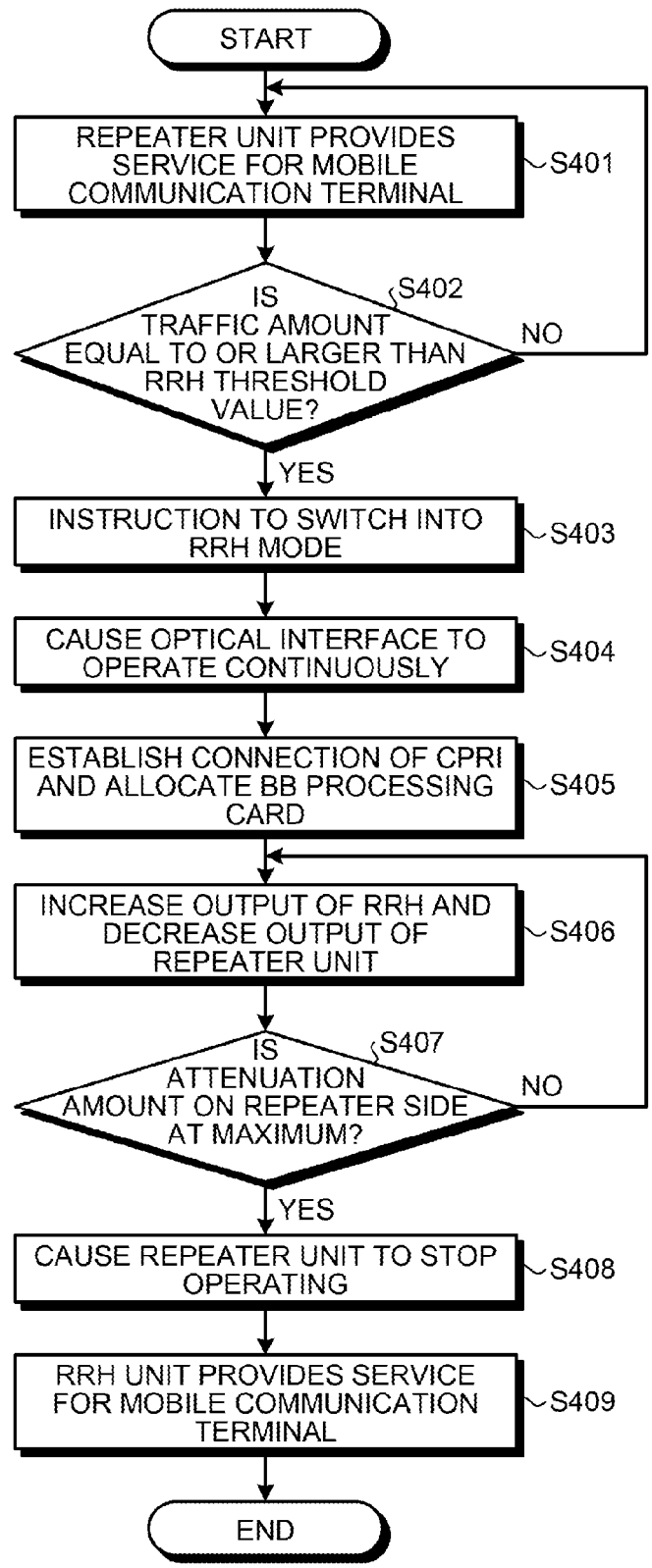
FIG. 10 is a flowchart of a process performed in the communication system according to the first embodiment to change from the repeater mode into the RRH mode.

Next, a flow in a process performed in the communication system according to the first embodiment to change from the repeater mode into the RRH mode will further be explained, with reference to FIG. 10. FIG. 10 is a flowchart of the process performed in the communication system according to the first embodiment to change from the repeater mode into the RRH mode.

The repeater unit 12 included in the hybrid wireless communication apparatus 1 provides a service for the mobile communication terminal 5 (step S401).

The controlling unit 36 included in the C-BBU 3 judges whether or not the traffic amount of the RRH 2 serving as the master base station of the hybrid wireless communication apparatus 1 is equal to or larger than the RRH threshold value (step S402). When the traffic amount is smaller than the RRH threshold value (step S402: No), the controlling unit 36 returns to step S401.

On the contrary, when the traffic amount is equal to or larger than the RRH threshold value (step S402: Yes), the controlling unit 36 included in the C-BBU 3 transmits a control signal instructing to switch into the RRH mode, to the controlling unit 20 (step S403).

After that, the controlling unit 36 shifts the optical interface 341 into a continuous operation (step S404).

The controlling unit 20 included in the hybrid wireless communication apparatus 1 establishes a full-time connection of the CPRI 6. Further, the controlling unit 36 allocates the hybrid wireless communication apparatus 1 connected via the CPRI 6, to the BB processing card 321 (step S405).

The controlling unit 20 decreases the output of the repeater unit 12 and increases the output of the RRH unit 11 (step S406).

The controlling unit 20 judges whether or not the attenuation amount for the output of the repeater unit 12 has reached the upper limit (step S407). When the attenuation amount has not reached the upper limit (step S407: No), the controlling unit 20 returns to step S406.

On the contrary, when the attenuation amount has reached the upper limit (step S407: Yes), the controlling unit 20 causes the repeater unit 12 to stop operating (step S408).

The RRH unit 11 included in the hybrid wireless communication apparatus 1 provides a service for the mobile communication terminal 5 (step S409).

As explained above, the hybrid wireless communication apparatus according to the first embodiment operates in the repeater mode when the traffic amount has become small and operates in the RRH mode when the traffic amount has become large. With this arrangement, when the traffic amount of the mobile communication terminals in the coverage area is small, it is possible to realize a reduction in the used resources and the electric power consumption, while maintaining the coverage area. On the contrary, when the traffic amount of the mobile communication terminals in the coverage area is large, it is possible to guarantee both the capacity and the coverage area. In other words, when the number of users in the coverage area has increased rapidly, the hybrid wireless communication apparatus according to the first embodiment is able to address the rapid increase in the number of users by securing the capacity promptly.

Further, when the hybrid wireless communication apparatus has shifted into the repeater mode, it is possible, at the C-BBU, to cancel the allocation of the BB processing card to the hybrid wireless communication apparatus and to either stop or shift the optical interface into the intermittent operation. With this arrangement, it is possible to improve the efficiency in using the resources at the C-BBU and to keep the electric power consumption low.

[b] Second Embodiment

Figure 11:
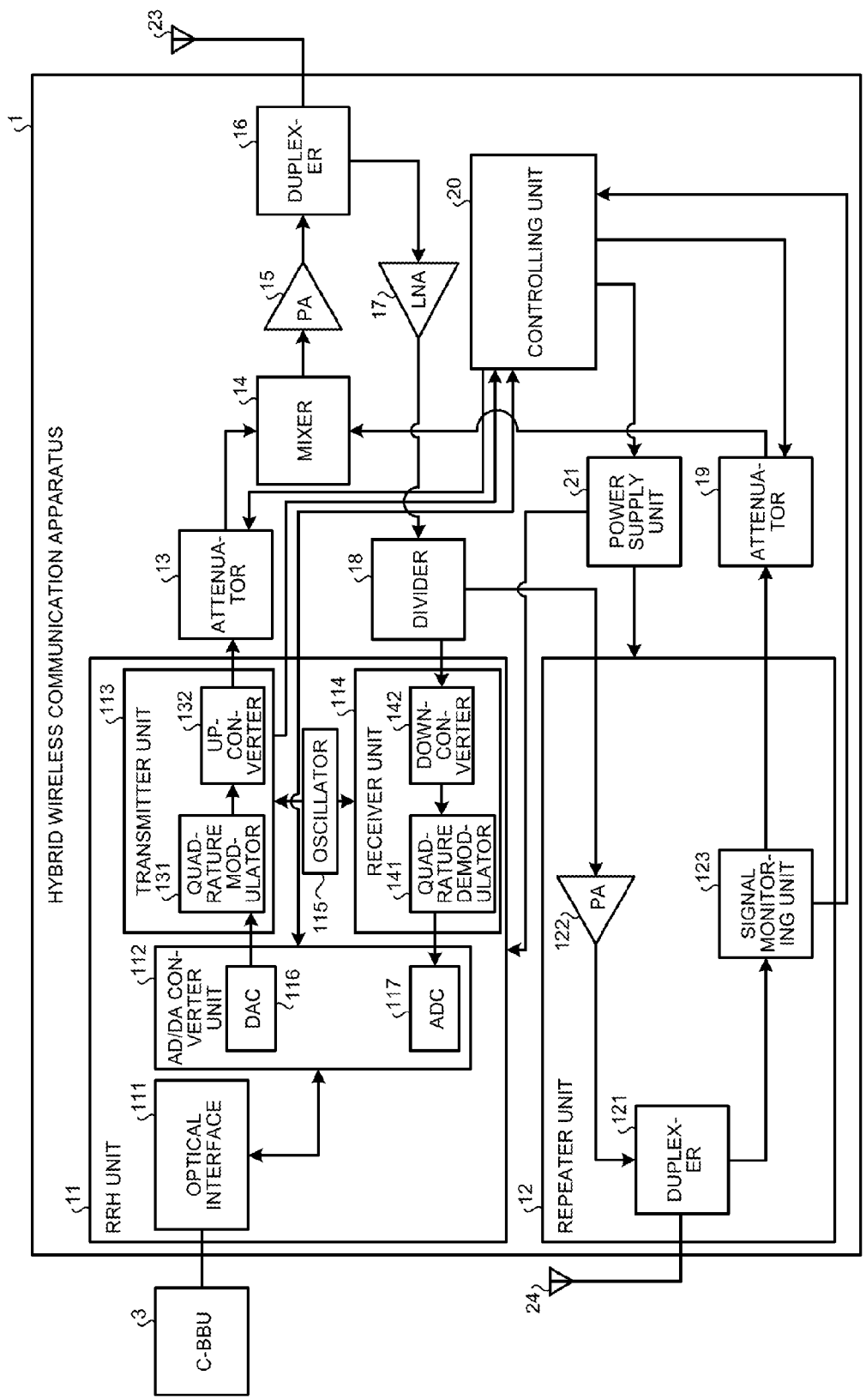
FIG. 11 is a block diagram of a hybrid wireless communication apparatus according to a second embodiment.

FIG. 11 is a block diagram of a hybrid wireless communication apparatus according to a second embodiment. The hybrid wireless communication apparatus according to the second embodiment is different from that in the first embodiment in that the hybrid wireless communication apparatus itself is configured to judge the traffic amount in the coverage area and to switch between the operation modes. Thus, in the following sections, a process of judging the traffic amount will primarily be explained. Some of the constituent elements in FIG. 11 that are referred to by using the same reference characters as those in FIG. 3 have the same functions, unless noted otherwise. In the following sections, explanations of the functions of some of the constituent elements that are the same as those in the first embodiment will be omitted.

In the RRH mode, the transmitter unit 113 monitors the intensity of transmission signals to the mobile communication terminal 5. After that, the transmitter unit 113 outputs the intensity of the transmission signals to the controlling unit 20.

In this situation, when the traffic accommodated by the apparatus itself has decreased, an average power of the transmission signals for a certain time period also decreases. For this reason, when the intensity of the transmission signals has become lower, it is possible to assume that the traffic accommodated by the apparatus itself has decreased and that there is no need to have the RRH function in operation.

The controlling unit 20 has stored therein, in advance, a transmission signal intensity threshold value used for judging whether the operation mode is to be switched into the repeater mode. The transmission signal intensity threshold value serves as an example of the "output threshold value".

The controlling unit 20 receives an input of the intensity of the transmission signals from the transmitter unit 113. After that, the controlling unit 20 judges whether or not the received intensity of the transmission signals is lower than the transmission signal intensity threshold value.

When the received intensity of the transmission signals is lower than the transmission signal intensity threshold value, the controlling unit 20 determines that the traffic amount has become smaller than the repeater threshold value and executes the switching into the repeater mode.

In the repeater mode, the signal monitoring unit 123 monitors the intensity of receiving signals from the RRH 2 serving as the master base station. After that, the signal monitoring unit 123 outputs the intensity of the receiving signals to the controlling unit 20.

In this situation, when the traffic accommodated by the master base station has increased, an average power of the receiving signals for a certain time period also increases. For this reason, when the intensity of the receiving signals has become higher, it is possible to assume that the traffic accommodated by the master base station has increased and that it is a good idea to increase the capacity by bringing the RRH function into operation.

The controlling unit 20 has stored therein, in advance, a receiving signal intensity threshold value used for judging whether the operation mode is to be switched into the RRH mode. The receiving signal intensity threshold value serves as an example of the "signal intensity threshold value".

The controlling unit 20 receives an input of the intensity of the receiving signals from the RRH 2, from the signal monitoring unit 123. After that, the controlling unit 20 judges whether or not the received intensity of the receiving signals is equal to or higher than the receiving signal intensity threshold value.

When the received intensity of the receiving signals is equal to or higher than the receiving signal intensity threshold value, the controlling unit 20 determines that the traffic amount has become larger than the RRH threshold value and executes the switching into the RRH mode.

In that situation, the controlling unit 36 included in the C-BBU 3 does not need to instruct the controlling unit 20 included in the hybrid wireless communication apparatus 1 to switch between the operating modes.

Figure 12:
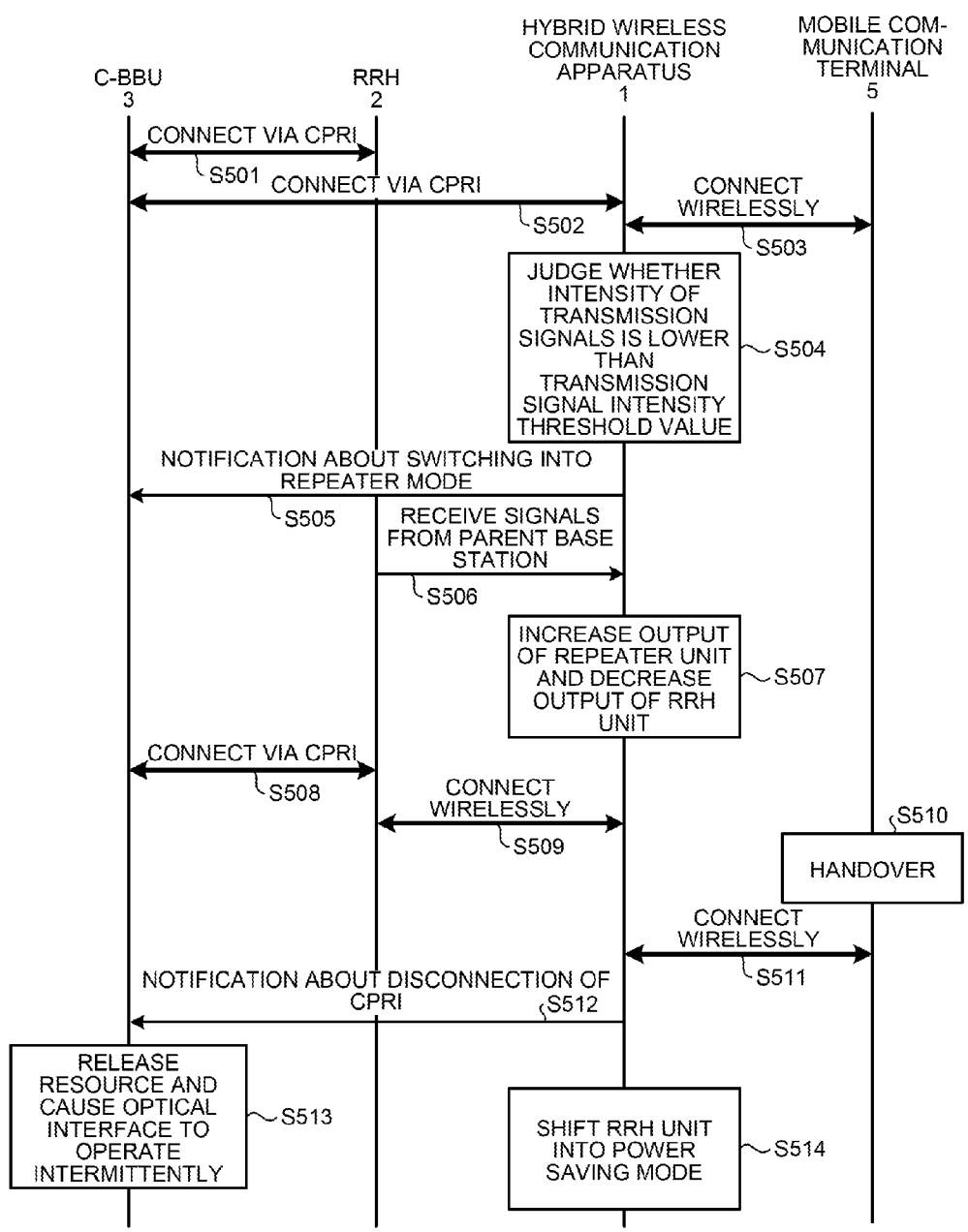
FIG. 12 is a sequence chart of a switching process from the RRH mode into the repeater mode performed in a wireless communication system according to the second embodiment.

Next, a procedure of switching from the RRH mode into the repeater mode in the wireless communication system according to the second embodiment will be explained, with reference to FIG. 12. FIG. 12 is a sequence chart of the switching process from the RRH mode into the repeater mode performed in the wireless communication system according to the second embodiment. In FIG. 12, the lapse of time is expressed downward.

Before the switching, the RRH 2 is connected to the C-BBU 3 via the CPRI 6 (step S501). Further, the hybrid wireless communication apparatus 1 is operating in the RRH mode and is connected to the C-BBU 3 via the CPRI 6 (step S502). Further, the mobile communication terminal 5 is present in the coverage area 10 and is wirelessly connected to the hybrid wireless communication apparatus 1 through the RRH unit 11 (step S503).

The controlling unit 20 judges whether or not the intensity of the transmission signals is lower than the transmission signal intensity threshold value (step S504). Let us discuss the situation where the intensity of the transmission signals is lower than the transmission signal intensity threshold value.

The controlling unit 20 notifies the C-BBU 3 of the switching into the repeater mode (step S505).

After that, the repeater unit 12 starts receiving signals from the RRH 2 serving as the master base station (step S506).

Subsequently, the controlling unit 20 decreases the output of the RRH unit 11 by increasing the attenuation amount of the attenuator 13. Further, the controlling unit 20 increases the output of the repeater unit 12 by decreasing the attenuation amount of the attenuator 19 (step S507).

In this situation, the RRH 2 serving as the master base station is keeping the connection to the C-BBU 3 established via the CPRI 6 (step S508).

Because the output of the repeater unit 12 has increased, the hybrid wireless communication apparatus 1 connects, through wireless communication, to the RRH 2 serving as the master base station via the repeater unit 12 (step S509).

Because the intensity of the receiving becomes lower due to the decreased output of the RRH unit 11, the mobile communication terminal 5 performs a handover process (step S510). In the present example, a situation will be explained in which the mobile communication terminal 5 performs a handover to the hybrid wireless communication apparatus 1 that has shifted into the repeater mode.

The mobile communication terminal 5 performs the handover process and wirelessly connects to the hybrid wireless communication apparatus 1 through the repeater unit 12 (step S511). In that situation, the mobile communication terminal 5 transmits a signal to the RRH 2 via the hybrid wireless communication apparatus 1, whereas the RRH 2 transmits the signal received from the mobile communication terminal 5 to the C-BBU 3.

When the attenuation amount of the attenuator 13 has reached the upper limit, the controlling unit 20 transmits a notification about a disconnection of the CPRI 6, to the controlling unit 36 included in the C-BBU 3 (step S512).

When having received the notification about the disconnection of the CPRI 6, the controlling unit 36 included in the C-BBU 3 cancels the allocation of the BB processing card 321 allocated to the hybrid wireless communication apparatus 1 and releases the resource. Further, the controlling unit 36 causes the optical interface 341 connected to the hybrid wireless communication apparatus 1 to operate intermittently (step S513).

The controlling unit 20 shifts the RRH unit 11 into the power saving mode (step S514).

Figure 13:
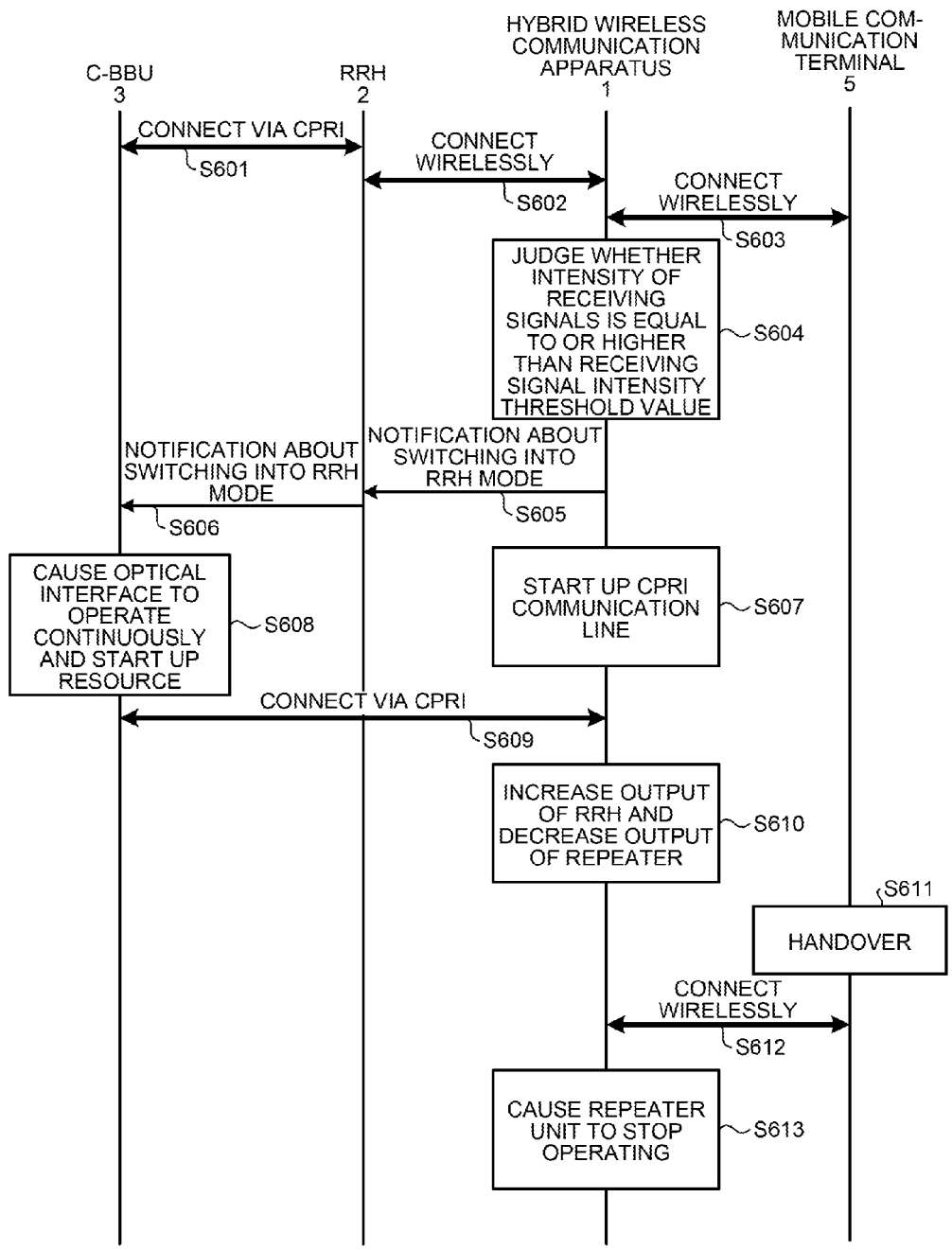
FIG. 13 is a sequence chart of a switching process from the repeater mode into the RRH mode performed in the wireless communication system according to the second embodiment.

Next, a procedure of switching from the repeater mode into the RRH mode in the wireless communication system according to the second embodiment will be explained, with reference to FIG. 13. FIG. 13 is a sequence chart of the switching process from the repeater mode into the RRH mode performed in the wireless communication system according to the second embodiment. In FIG. 13, the lapse of time is expressed downward.

Before the switching, the RRH 2 is connected to the C-BBU 3 via the CPRI 6 (step S601). Further, the hybrid wireless communication apparatus 1 is operating in the repeater mode and is wirelessly connected to the RRH 2 serving as the master base station (step S602). Further, the mobile communication terminal 5 is present in the coverage area 10 and is wirelessly connected to the hybrid wireless communication apparatus 1 through the repeater unit 12 (step S603).

The controlling unit 20 judges whether or not the intensity of the receiving signals from the RRH 2 is equal to or higher than the reception signal intensity threshold value (step S604). Let us discuss the situation where the intensity of the receiving signals is equal to or higher than the receiving signal intensity threshold value.

The controlling unit 20 transmits a notification for the C-BBU 3 about the switching into the RRH mode, to the RRH 2 (step S605).

The RRH 2 transfers the notification about the switching into the RRH mode, to the C-BBU 3. The controlling unit 36 included in the C-BBU 3 receives a control signal instructing to switch into the RRH mode, from the RRH 2 (step S606).

The controlling unit 20 starts up the connection of the CPRI 6 to connect to the C-BBU 3 (step S607).

The controlling unit 36 included in the C-BBU 3 shifts the optical interface 341 connected to the hybrid wireless communication apparatus 1 into a continuous operation. Further, the controlling unit 36 allocates the BB processing card 321 to the hybrid wireless communication apparatus 1 requesting a connection via the CPRI 6 and starts up the resource (step S608).

The RRH unit 11 connects to the C-BBU 3 via the CPRI 6 (step S609).

Subsequently, the controlling unit 20 increases the output of the RRH unit 11, by decreasing the attenuation amount of the attenuator 13. Further, the controlling unit 20 decreases the output of the repeater unit 12, by increasing the attenuation amount of the attenuator 19 (step S610).

Because the intensity of the receiving signal becomes lower due to the decreased output of the repeater unit 12, the mobile communication terminal 5 that has been connected to the hybrid wireless communication apparatus 1 by using the repeater unit 12 performs a handover process (step S611). In the present example, a situation will be explained in which the mobile communication terminal 5 performs a handover to the hybrid wireless communication apparatus 1 that has shifted into the RRH mode.

As a result of the handover process, the mobile communication terminal 5 wirelessly connects to the hybrid wireless communication apparatus 1 by using the RRH unit 11 (step S612).

When the attenuation amount of the attenuator 19 has reached a upper limit, the controlling unit 20 causes the repeater unit 12 to stop operating by exercising control so as to stop the supply of the electric power to the repeater unit 12 (step S613).

As explained above, the hybrid wireless communication apparatus 1 according to the second embodiment makes the judgment about the traffic amount by itself and determines the switching between the operation modes. As a result, when the traffic amount of the mobile communication terminals in the coverage area is small, it is possible to realize a reduction in the used resources and the electric power consumption while maintaining the coverage area, without the C-BBU having to make the judgment about the traffic amount. On the contrary, when the traffic amount of the mobile communication terminals in the coverage area is large, it is possible to guarantee both the capacity and the coverage area. In this manner, it is possible to improve the efficiency in using the resources at the C-BBU and to keep the electric power consumption low.

[c] Third Embodiment

Next, a third embodiment will be explained. A hybrid wireless communication apparatus according to the third embodiment is different from that in the first embodiment for being configured to switch between the operation modes when a predetermined time arrives. Thus, in the following sections, the switching between the operation modes according to points in time will primarily be explained. The hybrid wireless communication apparatus according to the third embodiment may also be configured as illustrated in the block diagram in FIG. 3. Further, the C-BBU according to the third embodiment may also be configured as illustrated in the block diagram in FIG. 4. In the following sections, explanations of the functions of some of the constituent elements that are the same as those in the first and/or the second embodiments will be omitted.

The controlling unit 36 included in the C-BBU 3 includes a clock. Further, the controlling unit 36 has stored therein, in advance, a repeater function starting time at which the operation mode is switched from the RRH mode into the repeater mode. In addition, the controlling unit 36 has stored therein, in advance, an RRH function starting time at which the operation mode is switched from the repeater mode into the RRH mode. The RRH function starting time serves as an example of the "first point in time", whereas the repeater function starting time serves as an example of the "second point in time".

The controlling unit 36 is configured to detect that the repeater function starting time has arrived, by using the clock included therein. After that, the controlling unit 36 transmits a control signal instructing to switch into the repeater mode, to the controlling unit 20 included in the hybrid wireless communication apparatus 1. In response to the control signal instructing to switch into the repeater mode, the controlling unit 20 executes the switching into the repeater mode.

Further, the controlling unit 36 is configured to detect that the RRH function starting time has arrived, by using the clock included therein. After that, the controlling unit 36 transmits a control signal instructing to switch into the RRH mode, to the controlling unit 20 included in the hybrid wireless communication apparatus 1. In response to the control signal instructing to switch into the RRH mode, the controlling unit 20 executes the switching into the RRH mode.

The processing procedure to switch from the RRH mode into the repeater mode in the wireless communication system according to the third embodiment is obtained by replacing the process of "judging whether the traffic amount is smaller than the repeater threshold value" at step S105 in FIG. 7 with the process of "detecting whether the repeater function starting time has arrived". Also, the processing procedure to switch from the repeater mode into the RRH mode is obtained by replacing the process of "judging whether the traffic amount is equal to or larger than the RRH threshold value" at step S205 in FIG. 8 with the process of "detecting whether the RRH function starting time has arrived".

Further, although the C-BBU 3 detects the arrivals of the times in the third embodiment described above, the detecting process may be performed by the controlling unit 20 included in the hybrid wireless communication apparatus 1. More specifically, the controlling unit 20 may include a clock, store therein the repeater function starting time and the RRH function starting time in advance, and detect the arrival of each of the times.

In that situation, the processing procedure to switch from the RRH mode into the repeater mode is obtained by replacing the process of "judging whether the intensity of the transmission signals is lower than the transmission signal intensity threshold value" at step S504 in FIG. 12 with the process of "detecting whether the repeater function starting time has arrived". Also, the processing procedure to switch from the repeater mode into the RRH mode is obtained by replacing the process of "judging whether the intensity of the receiving signals is equal to or higher than the receiving signal intensity threshold value" at step S604 in FIG. 13 with the process of "detecting whether the RRH function starting time has arrived".

As explained above, the hybrid wireless communication apparatus according to the third embodiment is configured to switch between the operation modes when each of the predetermined times has arrived. It is desirable to use this configuration in a place where, for example, it is definite that the number of mobile communication terminals in a coverage area increases at a certain time, such as an event venue or an amusement park. In such a place, the apparatus is arranged to operate in the RRH mode during the time period when the number of mobile communication terminals in the coverage area increases, and the apparatus is arranged to operate in the repeater mode during the other time periods. With this arrangement, when the traffic amount of the mobile communication terminals in the coverage area has increased, it is possible to secure the capacity and the coverage area, without having to monitor the traffic amount. On the contrary, when the traffic amount of the mobile communication terminals is small, it is possible to realize a reduction in the used resources and the electric power consumption, while securing the coverage area.

[d] Fourth Embodiment

FIG. 14 is a block diagram of a hybrid wireless communication apparatus according to a fourth embodiment. The hybrid wireless communication apparatus 1 according to the fourth embodiment is different from that in the first embodiment for being configured, in the repeater mode, to stop the supply of the electric power to the RRH unit 11 and to cause the RRH unit 11 to stop operating. Thus, in the following sections, the constituent elements in the repeater mode will primarily be explained.

The hybrid wireless communication apparatus 1 according to the fourth embodiment is obtained by adding a wireless modem 22 to the hybrid wireless communication apparatus according to the first embodiment. Some of the constituent elements in FIG. 14 that are referred to by using the same reference characters as those in FIG. 3 have the same functions, unless noted otherwise. In the following sections, explanations of the functions of some of the constituent elements that are the same as those in the first embodiment will be omitted.

In the repeater mode, the divider 18 is configured to output a signal transmitted from the mobile communication terminal 5 and addressed to the RRH 2 serving as the master base station, to a mixer 124.

The mixer 124 receives the input of the signal transmitted from the mobile communication terminal 5, from the divider 18. Further, the mixer 124 receives an input of a response to the control signal instructing to switch into the RRH mode, from the wireless modem 22. Further, the mixer 124 outputs the received signal to the duplexer 121, via the PA 122.

The duplexer 121 receives the signal transmitted from the mobile communication terminal 5 and an input of a response to the control signal instructing to switch into the RRH mode. After that, the duplexer 121 transmits the signal transmitted from the mobile communication terminal 5 and the response to the control signal instructing to switch into the RRH mode, to the RRH 2 serving as the master base station via the base-station-specific antenna 24.

The duplexer 121 receives a signal addressed to the mobile communication terminal 5 and a control signal instructing to switch into the RRH mode, from the RRH 2 serving as the master base station, via the base-station-specific antenna 24. Further, the duplexer 121 outputs the received signal addressed to the mobile communication terminal 5 and the control signal instructing to switch into the RRH mode, to a divider 125 via the signal monitoring unit 123.

The divider 125 receives inputs of the signal addressed to the mobile communication terminal 5 and the control signal instructing to switch into the RRH mode. Further, the divider 125 divides and outputs the signals to the attenuator 19 and to the wireless modem 22.

The wireless modem 22 applies a process such as an AD conversion to the received signal and outputs the control signal instructing to switch into the RRH mode to the controlling unit 20.

Further, the wireless modem 22 receives an input of a signal of a response to the control signal instructing to switch into the RRH mode, from the controlling unit 20. Further, the wireless modem 22 applies a process such as a DA conversion to the received signal and outputs the signal to the mixer 124.

In the repeater mode, the controlling unit 20 is configured to receive an input of the control signal instructing to switch into the RRH mode, from the wireless modem 22. After that, the controlling unit 20 outputs the signal of the response to the control signal instructing to switch into the RRH mode, to the wireless modem 22. Further, the controlling unit 20 starts up the RRH unit 11 by starting the supply of electric power to the RRH unit 11. After that, the controlling unit 20 executes the switching into the RRH mode.

In contrast, in the RRH mode, the controlling unit 20 is configured to receive an input of a control signal instructing to switch into the repeater mode, from the AD/DA converter unit 112. Further, the controlling unit 20 executes the switching into the repeater mode and causes the RRH unit 11 to stop operating, by exercising control to stop the power supply to the RRH unit 11 eventually.

When the hybrid wireless communication apparatus 1 is in the repeater mode, the controlling unit 36 included in the C-BBU 3 is capable of stopping the optical interface 341 connected to the hybrid wireless communication apparatus 1. Further, the controlling unit 36 notifies the hybrid wireless communication apparatus 1 of the control signal instructing to switch into the RRH mode, via the RRH 2 serving as the master base station apparatus of the hybrid wireless communication apparatus 1.

As explained above, in the fourth embodiment, it is possible to process the control signals received wirelessly, by using the wireless modem. With this arrangement, while in the repeater mode, it is possible to cause the RRH unit to stop operating, by stopping the supply of the electric power to the RRH unit. Consequently, the hybrid wireless communication apparatus according to the fourth embodiment is able to further reduce the electric power consumption, compared to the example in the first embodiment.

[e] Fifth Embodiment

Next, a fifth embodiment will be explained. A hybrid wireless communication apparatus according to the fifth embodiment is different from those in the first to the third embodiments for being configured, when a failure has occurred in the communication performed in a selected operation mode, so as to switch into the other operation mode. Thus, in the following sections, operations performed by the constituent elements when a failure has occurred will be explained. The hybrid wireless communication apparatus according to the fifth embodiment may also be configured as illustrated in FIG. 3. In the following sections, explanations of the functions of some of the constituent elements that are the same as those in the first embodiment will be omitted.

The controlling unit 20 monitors signals that are input to the AD/DA converter unit 112 from the optical interface 111 while the RRH mode is being selected. When a failure has occurred in the communication with the C-BBU 3 while the operation is in the RRH mode, the inputs of signals from the optical interface 111 to the AD/DA converter unit 112 stop. For this reason, when there are no inputs of signals from the optical interface 111 to the AD/DA converter unit 112 for a certain period of time determined in advance, the controlling unit 20 determines that a failure has occurred in the communication with the C-BBU 3.

When having determined that a failure has occurred in the communication with the C-BBU 3 while the RRH mode is being selected, the controlling unit 20 executes the switching into the repeater mode.

While the repeater mode is being selected, the controlling unit 20 monitors inputs of signals to the signal monitoring unit 123. However, the arrow indicating the monitoring is omitted from FIG. 3. When a failure has occurred in the communication with the RRH 2 serving as the master base station while the operation is in the repeater mode, the inputs of signals to the signal monitoring unit 123 stop. For this reason, when there are no inputs of signals to the signal monitoring unit 123 for a certain period of time determined in advance, the controlling unit 20 determines that a failure has occurred in the communication with the RRH 2 serving as the master base station.

When having determined that a failure has occurred in the communication with the RRH 2 serving as the master base station while the repeater mode is being selected, the controlling unit 20 executes the switching into the RRH mode.

As explained above, when a failure has occurred in the communication performed in the operation mode being selected, the hybrid wireless communication apparatus according to the fifth embodiment is configured to switch into the other operation mode. With this arrangement, it is possible to secure redundancy of the communication paths and to maintain continuity of the communication.

According to at least one aspect of the wireless communication apparatus, the base station system, and the wireless communication apparatus controlling method disclosed herein, an advantageous effect is achieved where it is possible to realize both addressing a rapid increase in the number of users and reducing the electric power consumption.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a selecting unit that selects a first mode in which communication between a baseband processing device and a mobile communication terminal is intermediated when a first condition is satisfied and that selects a second mode in which communication between another wireless communication apparatus and the mobile communication terminal is intermediated when a second condition is satisfied;
a wireless processing unit that, when the selecting unit selects the first mode, receives a wireless signal from the mobile communication terminal, converts the received wireless signal into a baseband signal, and transmits the baseband signal to the baseband processing device, and also, receives a baseband signal from the baseband processing device, converts the received baseband signal into a wireless signal, and transmits the wireless signal to the mobile communication terminal; and
a repeater unit that, when the selecting unit selects the second mode, transfers a signal output from said another wireless communication apparatus to the mobile communication terminal, and also, transfers a signal output from the mobile communication terminal to said another wireless communication apparatus.

2. The wireless communication apparatus according to claim 1, wherein, when a communication amount of the repeater unit is equal to or larger than a first predetermined value, the selecting unit determines that the first condition is satisfied, whereas when a communication amount of the wireless processing unit is smaller than a second predetermined value, the selecting unit determines that the second condition is satisfied.

3. The wireless communication apparatus according to claim 2, wherein, when a transmission output of a signal to the mobile communication terminal is lower than an output threshold value determined in advance while the first mode is being selected, the selecting unit determines that the communication amount of the wireless processing unit is smaller than the second predetermined value.

4. The wireless communication apparatus according to claim 2, wherein, when a signal intensity of a signal from said another wireless communication apparatus is equal to or higher than a signal intensity threshold value determined in advance while the second mode is being selected, the selecting unit determines that the communication amount of the repeater unit is equal to or larger than the first predetermined value.

5. The wireless communication apparatus according to claim 1, wherein, when a first point in time has arrived, the selecting unit determines that the first condition is satisfied, and when a second point in time that is different from the first point in time has arrived, the selecting unit determines that the second condition is satisfied.

6. The wireless communication apparatus according to claim 1, wherein, when a failure has occurred in communication with the baseband processing device while the first mode is being selected, the selecting unit selects the second mode.

7. The wireless communication apparatus according to claim 1, wherein, when a failure has occurred in communication with said another wireless communication apparatus while the second mode is being selected, the selecting unit selects the first mode.

8. A base station system comprising a baseband processing device and a wireless communication apparatus, wherein the baseband processing device includes:
a baseband processing unit that performs a baseband processing process on either a signal received from the wireless communication apparatus or a signal to be transmitted to the wireless communication apparatus; and
a controlling unit that allocates the wireless communication apparatus on which the process is to be performed, to the baseband processing unit, and
the wireless communication apparatus includes:
a selecting unit that selects a first mode in which communication between the baseband processing device and a mobile communication terminal is intermediated when a first condition is satisfied and that selects a second mode in which communication between another wireless communication apparatus and the mobile communication terminal is intermediated when a second condition is satisfied;
a wireless processing unit that, when the selecting unit selects the first mode, receives a wireless signal from the mobile communication terminal, converts the received wireless signal into a baseband signal, and transmits the baseband signal to the baseband processing unit, and also, receives a baseband signal from the baseband processing unit, converts the received baseband signal into a wireless signal, and transmits the wireless signal to the mobile communication terminal; and
a repeater unit that, when the selecting unit selects the second mode, transfers a signal output from said another wireless communication apparatus to the mobile communication terminal, and also transfers a signal output from the mobile communication terminal to said another wireless communication apparatus.

9. The base station system according to claim 8, wherein when a communication amount of said another wireless communication apparatus is equal to or larger than a first threshold value while the selecting unit is selecting the second mode, the controlling unit notifies the selecting unit that the first condition is satisfied, and
when a communication amount of the wireless processing unit is smaller than a second threshold value while the selecting unit is selecting the first mode, the controlling unit notifies the selecting unit that the second condition is satisfied.

10. The base station system according to claim 8, wherein, when the selecting unit selects the second mode, the controlling unit cancels the allocation of the wireless communication apparatus to the baseband processing unit.

11. A wireless communication apparatus controlling method comprising:
detecting that one of first and second conditions is satisfied;
when the first condition is satisfied, receiving a wireless signal from a mobile communication terminal, converting the received wireless signal into a baseband signal, and transmitting the baseband signal to a baseband processing device, and also, receiving a baseband signal from the baseband processing device, converting the received baseband signal into a wireless signal, and transmitting the wireless signal to the mobile communication terminal; and
when the second condition is satisfied, transferring a signal output from said another wireless communication apparatus to the mobile communication terminal, and also, transferring a signal output from the mobile communication terminal to another wireless communication apparatus.

\* \* \* \* \*